(12) United States Patent
Ribi

(10) Patent No.: US 11,061,259 B2
(45) Date of Patent: *Jul. 13, 2021

(54) PLURAL ELEMENT COMPOSITE MATERIALS, METHODS FOR MAKING AND USING THE SAME

(71) Applicant: Segan Industries, Inc., Burlingame, CA (US)

(72) Inventor: Hans O. Ribi, Hillsborough, CA (US)

(73) Assignee: Segan Industries, Inc., Burlingame, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/783,701

(22) Filed: Oct. 13, 2017

(65) Prior Publication Data

US 2018/0039101 A1    Feb. 8, 2018

Related U.S. Application Data

(63) Continuation of application No. 13/678,463, filed on Nov. 15, 2012, now Pat. No. 9,791,722, which is a continuation of application No. 12/972,323, filed on Dec. 17, 2010, now abandoned, which is a continuation of application No. 10/572,147, filed as application No. PCT/US2004/030675 on Sep. 17, 2004, now abandoned.

(60) Provisional application No. 60/504,180, filed on Sep. 17, 2003.

(51) Int. Cl.

| | |
|---|---|
| *G02F 1/00* | (2006.01) |
| *C08L 75/04* | (2006.01) |
| *G02F 1/01* | (2006.01) |
| *C08K 5/00* | (2006.01) |
| *B32B 37/14* | (2006.01) |
| *B29C 61/00* | (2006.01) |

(52) U.S. Cl.
CPC ............ *G02F 1/0072* (2013.01); *B32B 37/14* (2013.01); *C08L 75/04* (2013.01); *G02F 1/0147* (2013.01); *B29C 61/00* (2013.01); *B29K 2995/0018* (2013.01); *C08G 2280/00* (2013.01); *C08K 5/0041* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 2,710,274 A * | 6/1955 | Kuehl | B32B 17/10486 428/437 |
| 3,816,335 A * | 6/1974 | Evans | G01N 31/22 436/7 |
| 4,141,863 A | 2/1979 | Coran et al. | |
| 4,215,208 A | 7/1980 | Yee et al. | |
| 4,344,909 A | 8/1982 | De Blauwe | |
| 4,439,346 A | 3/1984 | Patel et al. | |
| 4,667,869 A | 5/1987 | Gen et al. | |
| 4,721,769 A * | 1/1988 | Rubner | C08G 18/679 356/43 |
| 4,929,211 A * | 5/1990 | Resnick | A63B 23/16 446/14 |
| 5,208,132 A | 5/1993 | Kamada et al. | |
| 5,415,544 A | 5/1995 | Oxman et al. | |
| 5,895,718 A | 4/1999 | Ishimura et al. | |
| 6,160,084 A | 12/2000 | Langer et al. | |
| 6,207,077 B1 | 3/2001 | Burnell-Jones | |
| 6,388,043 B1 | 5/2002 | Langer et al. | |
| 6,613,363 B1 | 9/2003 | Li | |

FOREIGN PATENT DOCUMENTS

| | | | | |
|---|---|---|---|---|
| EP | 353650 | A2 | 2/1990 | |
| GB | 1133436 | A * | 11/1968 | ............. C08G 18/86 |
| JP | S63-160897 | U | 10/1988 | |
| JP | S64-6992 | U | 1/1989 | |
| JP | 10-017622 | A | 1/1998 | |
| JP | 2002006280 | A | 1/2002 | |

OTHER PUBLICATIONS

"FDA 21 CFR 172.615". Food & Drug Administration, (Apr. 2001); pp. 62-63.*
Hanhi et al. "Elastomeric Materials". VERT, (2007); pp. 1-84.*
Day, J. "Science and Technology of Thermochromic Materials", Proc. SPIE 10304, Large-Area Chromogenics: Materials and Devices for Transmittance Control, 1030407 (Mar. 28, 1990); pp. 122-141.*
"Poly(methyl vinyl ether)", polymerdatabase.com/polymers/polymethylvinylether.html. Retrieved Dec. 28, 2020.*
Database WPI Week 200228; Thompson Scientific, London GB; AN 2002-2215741 XP002535493.
Lendlein et al. "Shape-Memory Polymers". Angew. Chem. Int. Ed. (Jun. 2002), pp. 2035-2057.
"Glossary of Ploymer Terminology", web.mit.edu/10.491-md/www/CourseNotes/Polymer_CN_Glossary.html. Retrieved Dec. 18, 2013.
Wheeler, "Ch. 13: Applications of Metal Pigmented Coatings". Metallic Pigments in Polymers. Rapra Technology Ltd., (1999); pp. 145-165.

* cited by examiner

*Primary Examiner* — Prashant J Khatri

(74) *Attorney, Agent, or Firm* — Michael J. Blessent; Bret E. Field; Bozicevic, Field & Francis LLP

(57) ABSTRACT

The invention provides composite materials comprising a shape change element and an optical change element, which elements undergo a change in response to an applied stimulus. Also provided are objects that include the subject shape changing materials, as well as methods of making and using the same.

6 Claims, No Drawings

PLURAL ELEMENT COMPOSITE MATERIALS, METHODS FOR MAKING AND USING THE SAME

CROSS-REFERENCE To RELATED APPLICATIONS

Pursuant to 35 U.S.C. § 119 (e), this application claims priority to the filing date of U.S. Provisional Patent Application Ser. No. 60/504,180 filed Sep. 17, 2003; the disclosure of which is herein incorporated by reference.

INTRODUCTION

Background of the Invention

Composite materials are structures or entities that are made up of distinct components. A variety of different types of composite materials have been developed and employed in a multitude of different and diverse applications. Because of utility of composite materials, there continues to be an interest in the development of new composite materials.

Relevant Literature

See e.g., U.S. Pat. Nos. 4,950,258; 5,665,822; 5,918,981; 6,465,791; 6,612,739; 6,669,444; 6,675,610; 6,740,094; 6,759,481; 6,720,402; 6,790,395; and 6,790,916.

SUMMARY OF THE INVENTION

The invention provides composite materials comprising a shape change element and an optical change element, which elements undergo a change in response to an applied stimulus. Also provided are objects that include the subject shape changing materials, as well as methods of making and using the same.

As such, embodiments of the invention involve plural intrinsic composite materials which possess and combine shape, memory, and structurally conforming compositions with a plurality of independent color changing and/or optical shifting compositions such as thermochromic, photographic, photochromic, tactochromic, solvate chromic, pH sensitive indicating chromic change agents, photo-luminescent materials, iridescent materials, birefringence materials, optical waveflight guiding and/or related materials. The plural intrinsic composite compositions are capable of simultaneously or sequentially undergoing shape and optical/visual changes uniquely and in pre-determined formats. The comprising compositions and embodiments can sense, report, and respond to environmental conditions they are exposed to.

The plural composite shape/memory/color optical shifting/changing materials exhibit novel multiple effects of simultaneously or with a predetermined historesis, changing shape in response to an environmental parameter such as temperature while also instantaneously changing its optical characteristics. The combined shape and optical shifting elements provides for new and unusual features, characteristics, effects, usage, play-value, novelty, and utility compared with either singularly color changing materials or shape changing materials.

DESCRIPTION OF THE SPECIFIC EMBODIMENTS

The invention provides composite materials comprising a shape change element and a optical change element, which elements undergo a change in response to an applied stimulus. Also provided are objects that include the subject shape changing materials, as well as methods of making and using the same.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Methods recited herein may be carried out in any order of the recited events which is logically possible, as well as the recited order of events.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As summarized above, the invention provides composite materials that include a shape change component and a color change component, as well as articles that include the subject composite materials and methods for making and using the same. In further describing the various aspects of the invention, the composite materials are reviewed first in greater detail, followed by a discussion of representative articles and methods of use thereof.

Color shifting/changing materials can include but are not limited to photo-luminescent material such as glow-in-the dark iron complexes, polydiacetylenes, polythiophenes, leuco-dyes, stilbene compounds, mercury complexes, melting waxes, encapsulated dyes, liquid crystalline materials, spyrene materials, mercury salt dyes, tin complexes, combination thermochromic/photochromic materials, photochromic agents, glow-in-the-dark materials such as zinc sulfide which has been copper doped, birefringent materials, shimmer materials such as those used in cosmetics, holographic mediums or holographic printed materials, heat formable materials which change structure based on temperature, natural thermochromic materials such as pigments in beans, piezochromic dyes, tribochromic dyes, photoconducting dyes, dyes used for organic light emitting diodes, or any acceptable thermochromic materials with the capacity to report a temperature change or can be photo-stimulated and the like.

Shape/memory materials with intrinsic optical properties can exhibit a plurality of shape/memory changes combined with single or multiple optical effects including but are not limited to thermochromic, photochromic, combined tactochromic and thermochromic effects, combined holographic and thermochromic effects, combined thermochromic and photochromic effects, combined photo-luminescent and thermochromic effects, various combined thermochromic effects such as liquid crystal effects and intrinsic color change effects from polydiacetylenes or alternative thermochromic materials, mechanochromic and thermochromic effects, pH sensitive color changes alone or in combination with other optical effects, and an assortment of related combined optical effects which exhibit synergy with the shape/memory change process.

Colloidal diacetylene compositions are readily polymerized using thermal polymerization and UV photopolymerization. The resulting polymer remains very stable in a broad range of organic and aqueous solvents. The thermochromic temperature transition shows robust thermochromic reversibility in a wide variety solvent systems including harsh organic solvents such hexane, chloroform, acetone, ethanol and the like. The thermochromic transition is dictated by the fatty acid chain link. Chain links form C8 fatty acids through C40 fatty acids with a diacetylene moiety which have been synthesized, dymerized and polymerized. Thermochromic transitions have been obtained with pure dymerized Polydiacetylene polymers as well as plural compositions where the diacetylene polymer has been mixed with a thermally responsive composition such as paraffin, waxes, block co-polymers, plastics, silicon rubbers and the like. The plural intrinsic compositions show excellent stability, thermal reversibility, and manufacturing processing capabilities.

Refractive index shifting and iridescent materials and birefringent materials can be used as additives to the shape/color change embodiment. Thin mica and glass particles can be used to create a shimmering effect during the shape changing process.

Holographic films, stamps, labels, inclusions or layers can be laminated, adhered, or incorporated into the shape/memory material to create further novel optical effects during the shape/memory change process. Physical shape change effects combined with optical refractive index change effects can be used to create new and unexpected animation effects with out physical contact. The shape change will transmit an intended holographic change effect when the change occurs. The effect can be localized or transmitted throughout the embodiment. The holographic effect can correlate with the actual physical shape/memory change or be used to create unexpected and entertaining optical effects during the shape change/shape memory process.

Translucent holographic images embedded in shape memory material through direct heat lamination, using heat or cold laminating films, be directly imprinted into the shape/memory material, be introduced or printed into to the material using laser etching techniques, adhered to the surface using pressure sensitive adhesive materials, be stamped using dye stamping holographic labeling techniques, roll pressed onto the material, cast or hot pressed, hot stamped directly on indirectly onto the material or the like.

Shape/memory/optical materials can be utilized in novel formats to create flexible displays which eliminate the limitations of flat-screen display devices. For example, Flat panel display components used for computer and electronic devices are restricted to a planar configuration, in a square or rectangular format. Integrating shape/memory materials can be used to comprise interconnections between display components such that the display can be flexibly changed to assume non-planar shapes. By way of example, a liquid crystal or alternative display can be designed with interconnects to fold into a cube or geodesic structure. Icosahedral geometries can be generated using discrete hexagonal and pentagonal segmentations. Display panels could thus be folded, unfolded, and utilized in a variety of geometries depending on the application of interest. Triggering of the shape/memory process can be induced using integrated heating elements in contact with the shape/memory material such that a pre-determined shape can be assumed upon engaging the appropriate voltage to initiate electrically conductive heating.

Shape/memory/color change adhesives can be employed where a characteristic glue or adhesive can be made to simultaneously change shape/properties and/or color. In particular, polydiacetylenic pigments or other thermochromic agents can be formulated along with an adhesive component which has a temperature dependence on its adhesive characteristics or strength.

Particle additives of a variety of shapes and sizes can be combined with the shape/memory material to create attractive and interesting visual affects during the shaping, deformation, reshaping or shape memory process. Glitter as an additive can be comprised of metalized film, iridescent film, metal particles, thin iridescent glass flakes, and various colored plastic film particles. Other particle additives can include lake dyes of various colors, refractive index matching particles, fluorescent particles, fluorescent micro-beads, magnetic and paramagnetic particles, optically polarized particles and films Depending on the shape/memory material composition and associated optical/change composition employed, it may be desirable to ensure the comprising composition does not stick or adversely adhere to itself during use. Lubricating agents or surfactants can be employed to facilitate non-stick or adherence properties. By way of example, shape/memory color change filaments used for artificial hair can be treated with standard hair conditioner to mitigate tangling and facilitate detangling during the shaping process.

Self-configuring or morphological changing embodiments can be generated using shape/memory/optical changing compositions. For example, a flat or deformed layer comprised with shape/memory and/or color shifting materials can assume an initial shape. The shape/memory component can contain a relief material or additive which harbors an intrinsic shape pre-set in the composition. Upon warming, object will assume its first state or configuration (e.g. a factory molded toy configuration).

Woven fabrics comprising shape/color shifting composites can be prepared using standard fabric weaving process, knitting process, sewing processes and the like. Woven or fabric forms of shape/memory compositions and shape/memory compositions integrating color/optical change materials can be used in garments, swimwear, toy or doll clothing, footwear, military garments, exercise wear and garments, indoor and outdoor sporting garments, patches, padding, costumes and related embodiments where it is desired to have a temperature dependent shape/memory change and/or color shift associated with usage.

Fiber optics and optical wave guides can also be incorporated into the shape/memory changing material such that the optical properties and effects comprising the fiber optical and/or wave guide material can be preserved even though the composite embodiment may undergo a significant structural or shape change. For example, a series of thin fiber optic strands may be positioned in parallel along the plane of a shape/memory composite. The strands may be laminated of embedded into the shape/memory material such that only the beginning and ends are free and un-embedded. Light may be transmitted into the optical fibers from one end and emitted from the other end. As the shape memory material is transitioned from one shape to another, the illuminating light pattern from the emitting end can be made to change its pattern and form. Unique optical effects can be achieved from the emitted light pattern.

By way of further example, hair on a doll may be comprised of a fiber optic internal core along the length of the strand. The fiber optic strand may be coated with an outer sheath of shape memory material such that each end of the hair strands expose both ends of the fiber optic internal core.

Fiber optic and wave guide materials may be selected to possess both the light guiding properties of guiding and directing light and as a relief material which provides the embodiment with incremental force for resuming an initial shape.

Miniature light emitting diodes and associated circuits can be included or imbedded within the plural composite such that the led will go on or off depending on the shape or shape change of the embodiment of application. The led may begin flashing when a certain shape is assumed.

A multiplicity of plural shape and optical effects can also be achieved by incrementally adding one or more color change and other optically recognizable components. For example, a shape memory material can be admixed with a thermochromic material as well as a refractive index changing material such as micro-particulate mica. The shape/color/optical effect can be sequential. Initially, the comprising composition will have a starting color and shape below the softening temperature of the shape/memory material. Likewise, the optical refractive index of the micro-particulate mica will have an initial visual reflectivity. As the temperature is increased, the color change of the thermochromic material can be selected to change first. The shape change of the shape/memory change material can be set to change second. Upon the final shape change and during the shape changing process, the reflectivity of the micro-particulate material will subsequently change. The sequential effect give rise to a continuum of physical and optical effects. Likewise, the effects can be reversed upon cooling and/or reheating and reshaping and subsequent return to the initial shape and starting temperature.

The plural composite materials can be co-formulated, co-extruded, co-mixed, laminated together, painted or coated, printed, fused, or the like to make the desired output. Injection molding process can be used to conveniently mold high volume applications with well defined initial configurations. Sheet extrusion and forming can be used to create flat well defined sheet thicknesses and textures. Filament extrusion and drawing can be conveniently used to create thin strands and hair-like thicknesses and properties. Blow molding can be used to create cavitated molded forms such as three dimensional enclosures. Thermoforming can be used to create cavitated open three dimensional embodiments. Pressure molding and forming can be used to create simple solid forms. Any of a variety of forming and molding techniques can be used to form initial shapes for the shape/memory color change plural composites.

Shape-memory plastics can be deformed from 1% to 500%. More usually they deform from 10% to 400% and typical applications call for deformation from 100% to 300%. The degree of desired deformation will depend on the application of interest and the capabilities of the shape/memory composition selected for a particular embodiment.

The shape memory changing composite can be formulated for various temperature effects and temperature settings from=50° F. to high temperatures above about 500° F. In representative embodiments, the desirable shape/memory change is formulated to be set between about 10° F. and about 300° F. In representative embodiments, the temperature will be set between about 32° F. and about 200° F. and more usually between about 50° F. and about 130° F.

Shape/memory material can be purchased from vendors such as BASF, DuPont, Bay Materials or the like. Shape/memory composites can be made with shape/memory plastics, vinyl, high and low impact plastics exotic polymers used for various industrial applications, epoxy resins where various ratios between the epoxy and hardener can be utilized, metals and metal alloys, bi-metal materials used in thermometers, comprised with components including rubbers, silicon-based materials, certain ceramic materials, pressure sensitive material, stampable materials, biologically compatible materials, carbohydrate based materials, organic lipophilic materials, waxes, biologically active materials, certain tissues such as muscle, skin or hair, bio-absorbable materials, glass compositions, ingestible materials, resins, epoxy-based composites and resins, glue and adhesive compositions, polyurethanes and derivatives (Mitsubishi Heavy Industries, Japan), shape memory alloys, shape-memory plastics (mnemoScience, Aachen, Germany), oligo-dimethacrylate, n-butylaerylate and related polymeric plastics, thermoplastic elastomers, networking polymeric systems, classes of polyesters, polymers based on monomers comprised with L,L-dilactide, diglycolide, and p-dioxanone, thermoplastic multi-blockco-polymers, macrodiols, homopolymers of lactide or glycolide compositions, or copolymers of lactide and glycolide groups, chiral and non-chiral polymers, polyvinyl chloride compositions, polyethylene terephthalate and analogs, and related materials possessing shape/memory characteristics.

Foam-based compositions can be formulated where closed or open cell compositions comprise a rigid configuration at lower temperatures and a spongy pliable foam-like configuration at elevated temperatures. The shape-changing composition can be foamed with air by means of air inclusion during mixing, differential pressure injection, addition of foaming agents (e.g. those used for injection molding), and the like. Shape changing compositions can contain from 0% air to 90% air depending on the application of interest.

Foam-based compositions have the advantage of providing increased volume an a per pound cost basis. Foam-based compositions can be used for various toy and game applications where the spring-back of encapsulated air provides an array of play and molding options. Foam-based compositions can be used as temperature dependent actuation means where a compressed foam does not expand until a certain temperature is achieved. When a desired temperature is achieve, the composition material re-orients to a desired dimension.

Air pocketed laminates can be prepared such as those used in packaging materials. Air pocketed laminates can be prepared by laminating periodically dimpled sheets of shape-changing materials together such that the dimpled regions entrap a desired amount of air. Pressure heat sealing can be used as a means for laminating a top layer to a bottom layer. Air can be hermetically sealed in the process. Air pocketed laminates can find a variety of utilities and uses. Color/shape/memory air pocketed laminates can be used for modeling, forming and free play for children. Like-wise, air pocketed laminates can be used for packaging and retaining items to be shipped. In the warmed state above ambient shipping conditions, the laminate can be used to precisely fit around an object. When cooled, the laminate will form a snug solid fit around the object for shipping. The process can be reversed to release the object once it has been delivered.

Organic polymeric groups can range in molecular weight from less than about 1000 g/mol to more than about 10,000,000 g/mol. The shape/memory plastic selected, polymer composition and degree of polymerization will depend on the application of interest.

The shape changing material may be comprised by a composition which reversibly changes from one configuration to another and back again, irreversibly changes from one configuration to another and remains in its final shape, or can be formulated to possess intrinsic abilities to undergo various permutations with and without having memory of its initial or final configuration.

The absolute shape/memory change setting will depend on the product application of interest. For example bath toys have been prepared which change color and shape/color when warmed to about 100° F. At room temperature or below, the toy will have a solid plastic-like feel. The color or hue can be adjusted to correspond to a desired visual attractiveness for the toy. When the toy is touched, or exposed to temperatures near body temperatures (e.g., 75-90° F.) the corresponding color and shape will begin to change. The plastic embodiment will become softened and begin to deform. Likewise, the thermochromic material comprising the composition along with the shape/memory plastic will visually change color corresponding to the rise in temperature. When completely warmed above the softening temperature of the shape/memory material, the toy will be completely deformed to whatever configuration desired. When chilled back to room temperature or below, the plastic shape/color change embodiment will harden into its deformed configuration. Likewise, the toy will change color reversibly back Reversible and irreversible versions of the color change agent can be employed depending on the desired embodiment of interest. Reversible agents can be employed where it is desirable to have a multi-use effect or reuse the color change effect. For example, toy products with continued and repeated play value will find use of a reversible color change component comprising the final embodiment. In this case it would be desirable to utilize a reversible thermochromic or luminescent material which can be repeated during usage. In another example, it may be desirable to record a single color change permanently. In this case, it would be desirable to utilize a thermochromically irreversible material which changes from one color to another giving rise to a permanent massage.

Shapes can be made to change slowly or with rapid response time by adding relief layer composites, embedded springs, flexible stays, or relief additives. The relief layer or additive acts to accentuate a shape/memory effect. For example, a stiffened plastic thread can be coated with a shape memory material whereby the coating will be moldable at a temperature setting. Once molded and chilled to set the desired shape, the fixed shape strand will hold its configuration until it is warmed above the softening temperature of embodied composition. The softened shape/memory material will permit the stiffened plastic thread to resume its original structure and extend to its original position.

The shape/memory material and associated relief layer material can be formulated with 95% relief material to 5% shape/memory material. More usually with 50% relief material and 50% shape/memory material. Typically the shape/memory material will comprise from 60 to 100% of the composition. The exact ratio of shape/memory material to relief material will depend on the desired final property of the embodiment or application of interest. The configuration, shape/memory composition, relief composition, and method for adjoining each component should be considered when designing the final embodiment.

The shape/memory/optical material can be comprised with an elastomeric material such that the elastic properties of the elastomer can be utilized to create spring or rubber band-like function. An associated elastomer can be stretched along with the entire comprising composition above the softening temperature of the shape/memory material. A shape can be enforced once the composition is made stiff at below the softening temperature of the shape/memory/optical material. Upon elevating the temperature of the composition above the softening and/or optical change transition temperature, the entire composition will respond elastically to its original configuration and optically visual appearance.

The shape/memory/optical material can be comprised as above with a flexible metal or plastic spring such that the spring will facilitate the conformational changes that the plural intrinsic composite undergoes. Any of a variety of other flexible, semi-rigid, elastomeric, load bearing, torsion bearing, friction bearing, or related materials can be employed as a facilitating means to impose initial and final conformations on the plural intrinsic shape/memory/optical change composition. By way of example, a sponge-like foam can be coated or contained within the shell of a shape/memory/optical change material such that a shape can be imposed and solidified by heating and cooling in an intended shape. Subsequent heating and softening will cause reformation to the initial molded shape assisted by the spring action from the entrapped foam lattice.

Similar compositions of the thermal switching/responsive material in combination with a color-shift reporting element provides for a new composition with intrinsic capabilities of both changing its physical properties such as solid to liquid phase transition, viscosity, hardness, and related physical parameters as well as a change in its visual color appearance characteristics such as color hue, color density, opacity, and related optical characteristics. These plural compositions have multiple applications in areas including adhesives, medical implants, industrial compositions for engineering and electronics, game applications for new color-shifting toys, materials applications for new building compositions including household and commercial applications, as well as other retail commercial and industrial applications.

Temperature changes can be introduced with water, air, electrically conductive circuits, heat lamps, radiating heat sources, microwave heating where the shape/memory material has a microwave reactive component present, frictional heat induction, chemically induced heating, laser optically induced heating, semiconductor laser optically induced heating, resistive heating elements, Peltier plate induced heating, fluid circulating heating sources, solar heating, directed or open flames, burning rocket propellant, various forms of contact and conductive heating, heating body contact and the like.

Electrically conductive heating elements can be employed where conductive and/or resistive heating inks are printed into various or specific patterns to achieve a desired localized or patterned heating location on the embodiment.

The shape/memory and/or color change materials will comprise from 0.01% to 100% of the embodiment. More usually, the shape/memory and/or color change materials will comprise from 0.1 to 100% and typically comprise from 1% to 100%.

The final embodiment can be comprised with localized portions of the shape/memory and/or color change comprising material such that hinges, localized deformations, bends, protrusions, bulges, patterns, designs, extensions, and the like can be effected whereas the remaining portion of the final embodiment is unaffected by the shape/memory and/or color change process.

Shape/memory materials can be comprised with inert plastics, strained wood, polymeric composites, foods, lift-off layers adhered to food layers whereby the food will change shape when the shape/memory material changes shape. For example, a sugar layer, edible paper layer, fondant layer or the like can be coated on a thermally responsive shape/memory material. The edible layer can be plain or colored with food color. Alternatively, the edible layer can be printed using a screen printing or ink jet printing method to create a graphic image, pattern, message or the like. When the laminate is exposed to heat, the shape/memory material will correspondingly change shape to a desired configuration. Graphics printed on the edible layer can be initially generated such that they are accurately displayed after the shape change has occurred. Prior to the shape change, the graphic may be confused, scrambled, or distorted. The shape/memory change process provides an attractive means to create new interactive food groups.

The color change or optical change agent can be formulated to conform to a desired color change at a predetermined temperature setting. The two effects, including shape and/or color change, can work synergistically to achieve a desired product effect. The temperature settings for color and shape change can be designed into the embodiment of interest such that the color and shape change occur at the same temperature or different temperatures. It may be desirable for the color change to occur prior to the shape change during the temperature elevation process. Alternatively, it may be desirable for the shape change to precede the color change during the temperature elevation process.

Agents used for the color or optical change process can have an abrupt color change within 1 to 2 degrees centigrade or can have hue change continuum over a substantially larger temperature range. Color changes can be formulated to occur from within about 0.1° F. to about 400° F. range, including from about 1° F. to about 200° F. range, and such as within a 5° F. to 100° F. range.

The shape/memory composite may be transparent, opaque, or have a pre-determined level of opacity. The composite my have non-changing colors or stationary colors added to create pre-determined initial colorations. Single or multiple color changes and/or hue changes can be utilized such that the color change can reflect different temperature achieved as well as different physical states for the shape/memory material being employed.

Plural intrinsic shape/memory/optical shift compositions find use in toy applications where the toy is played with, warmed or cooled and the resulting toy changes both shape and color, games, dolls, doll components, toy and doll accessories, re-sizable and reshapeable action toys, indoor and outdoor toys, bath toys, arts and crafts applications, transient molding materials for making temporary molds, personnel care products, temperature monitoring devices, house-hold products, appliances, packaging materials, industrial monitoring devices, switches and fuses, child safety products, sterilization indicators, cooking devices, reusable thermometers, physiologic thermometers, process control monitors, athletic equipment, medical devices such heart stints and catheters which require a shape change or expansion which can be reversed, merchandise displays, adhesive mechanisms, swimming pool accessories, beverage bottles, collapsible containers for food storage and general storage, cook ware utilizing a desired elevated color/shape change, moldable athletic equipment such as skis, swimming gear, moldable personnel accessories such as jewelry, eye ware, head and foot gear which can be reconfigured or shaped for different purposes, tubing and piping for gas and liquid flow which indicates flow where flow is affected by temperature, exercise training gear where stiffening or softening can be regulated to increase or decrease physical exertion, battery testing devices where power levels can be indicated by both a shape and optical change, fire safety devices, and the like.

Various shapes and colors can be pre-set for various applications. For toys, it is desirable to use color/shape changing plural composites which shift color and shape under physiologic or close to ambient conditions that would normally be encountered during toy play. Examples include indoor and outdoor play, bath toys with warm and cool water effects, swimming pool toys, toys with mild heating elements or light heating ovens for induced heating.

For certain toy, game, craft, entertainment, operations, prototyping, and related applications, it will be desirable to utilize a mold fixture device in combination with the shape/memory/optical change material to create well defined structured, featured, patterned, shaped, contoured, or three-dimensional objects. For example, toy manufactures could provide and sell both the shape/memory/optical change material in a sheet form as well as a simple to use molding station to create fun shape/color changing designs, patterns, play figures, dolls, action figures, toy trucks or cars, heads, toy robots and/or parts, toy airplanes, learning pieces, 3-d puzzle pieces, hats, dishes, cups, building pieces, animal or bird shapes, flower or insect shapes or any of an unlimited variety of toy examples.

The shape/memory/color changing kit could include pre-cut pieces of shape/memory/color change sheets. The sheets could be plain or pre-printed and die cut. Printed varieties could include images which appear flattened and distorted until molded into the designated or intended shape. Die cut patterns or shapes could include score marks, relief lines, and cuts intended to facilitate the molding and contouring process. The pre-cut pieces could be sized according to the manufactures specifications to be used with a molding station.

The molding station can comprise a means by which a pre-cut sheet can be inserted into an insert zone. The insert zone would help to orient the sheet. A shaping or molding form could be positioned below the sheet insert zone and a conforming upper mold form similarly shaped to the lower form could be positioned immediately above the sheet insert zone. The configuration provides a means to form a sandwich including the upper form, the shape/memory/color changing sheet, and the lower mold form. The system can provide a means to rapidly heat the sheet, sandwich and compress the sheet from a planar two-dimensional shape to a contoured three-dimensional shape, and a cooling means by which to solidify the shape/memory/color change material into a desired design.

The molding station can be designed in different ways to use hot and/or cold air, hot and/or cold water, radiant heat along with a cooling means, or any of a variety of cost effective and reliable heating and cooling means depending to the various applications of interest. The molding station can also come with easy to remove and replace upper and lower molding forms such that different objects can be shaped as desired. This configuration provides the manufacturer with an on-going source of extending the product line.

Objects such as toys or crafts items can be shaped, annealed and solidified into designated forms and kept that way for use or re-flattened and shaped by a person using the system. Toys, for example, could be formed, played with, and then flattened again for storage.

Embodiments can include electrically conductive heating elements for inducing the heating/shape/color change. The electrical conductive circuit can be oriented on the embodiment or application of interest such that the circuit provides heat when a voltage is supplied; the applied heat results in a temperature necessary to induce a color and shape change in the toy. Conducting materials for creating integrated pre-determined heating elements include silver conducting inks and pastes, metal based inks, carbon based inks, inks containing indium tin oxide as a conductive material or the like.

Heating elements can be adhered, contacted, stamped, etched, applied using photo lithography, vapor deposited, coated, extruded, laminated, pressure sensitively applied, taped, painted, molded, sprayed, screen printed, pad printed, flexo graphically printed, Gravier printed, off-set printed, flood printed, or applied by any convenient means compatible with a production process.

Sensing elements such as piezo-electric devices and substrates, radio wave frequency devices (passive and active) where shape and configuration can be used to modulate reception or transmission, strain gauges, thermocouples, resonating devices, receiving and transmitting devices, galvanic monitoring elements, and microelectronic devices.

Foamed forms of the shape/memory/optical shifting/changing compositions can be prepared such that the composite is in a Styrofoam-like configuration. Foamed forms of the composite can be made using standard foaming/forced air methods.

Hard solid/softened pliable, hard solid/liquid molten, soften pliable/liquid molten, hard solid stretch/softened relaxed, and a wide range of convenient forms can be utilized for various product embodiments which require specific characteristics and properties.

A wide variety of combinations and permutations of shape changing plastic/optical component additives can be utilized for varying product applications. Single optical agents can be used alone with a shape changing plastic or in combination with one or more additional selective optical agents. A wide range of plural property changes can be derived that can be engineered to occur simultaneously or sequentially.

Shape memory polymers can include polynorborene, polyisoprene, styrene butadiene, and polyurethane-based materials and vinyl acetate, and polyester-based compounds. A variety of formulations and derivations can be compounded. Exemplary polyethylene and polypropylene vinyl acetates (Du Pont Corporation, Atofina Corporation, Canada) can be used as filler compositions, to add rubber-like characteristics, to add elasticity, to increase or decrease transition temperatures and the like. Polyethylene and polypropylene vinyl acetates are readily mixed into a wide range of compositions (300° F. or below).

By way of example, but not limitation, base thermoplastic polyurethanes, polyesters, and related compositions typically used for lamination adhesives and coatings (Mor-Ester™ 49000-P polyester, Rohm And Haas Corp., Estane™ solution and hot melt applications compositions including 5703, 5719, 5714, 5701, 5708, 5714, 5707, 5715, and 5778, and Tecothane™ aliphatic compound OP series OP600 (Noveon Corp.) can be used as base materials for low temperature shape-changing plastics.

Capero-lactones, and related thermoplastics that have putty-like characteristics at moderately high temperatures (e.g. Protoplast™, WFR Aquaplast Corp.) and gum bases that have putty-like characteristics at lower temperatures (e.g. Dreyco base and related gum bases, L. A. Dreyfus Corp.) can be used as starting materials for high temperature (140° F. or greater) and low temperature putty bases (140° F. or lower).

Polymer compositions can be further cross-linked for increased temperature settings, durability, structural strength, and related properties which can impart a desired effect on the polymer's structure and character. Cross-linking, irradiation, repeated heat annealing, and compounding methods can be utilized.

Thermoplastic compositions that can be used as additive plastics include, but are not limited to: polyvinyl chloride (PVC), various polyolefins, such as polypropylene and polyethylene, cross-linked high-density polyethylene (XLPE), softened acrylic, polycarbonate, ABS, thick Kapton™ tape materials, Teflon™ (tetrafluoroethylene TFE and fluorinated ethylene polypropylene FEP)-based materials, brand names such as Kydex, polystyrene, thermoplastic polyesters, nylon, styrene-butadiene, epoxy casts, polybutylene, TPX (poly (methyl pentene), PETE, PETF, polyethylene teraphthalate G copolymer (PETG), polysulfone (PSF), polyutethane (PUR) Thermanox™ (TMX), polymethylmethacrylate, and the like.

Specialty polymeric compositions can be customized and developed for specific purposes. Specialized and customized materials and compounded compositions design and formulations can be commissioned and supplied (Bay Materials Ltd., CA, Landec Corp., CA). Custom synthetic starting materials, cross-linking agents, compounding materials, compounding mixtures, additives, processing techniques, treatments, methods for conditioning, processes, processing equipment, processing techniques and the like can be used for creating new forms of shape and memory plastics and putties.

Adjustment of Hardening/Softening Putty Characteristics:

The softening/hardening characteristics of color/shape/memory putty can be adjusted by altering the ratios of thermoplastic to gum base. A fixed concentration of optical pigment such as a thermochromic pigment, photochromic pigment, photo-luminescent pigment, glitter, or other color/optical dye/agent is added at a fixed ratio for a desired optical effect.

| Protoplast™ Thermoplastic | Dryco™ base Gum | |
|---|---|---|
| 100% | 0% | Hardened high temperature putty |
| 95% | 5% | |
| 90% | 10% | |
| 85% | 15% | |
| 80% | 20% | |
| 70% | 30% | |
| 65% | 35% | |
| 60% | 40% | |
| 55% | 45% | |
| 50% | 50% | Medium temperature putty |
| 45% | 55% | |
| 40% | 60% | |
| 35% | 65% | |
| 30% | 70% | |
| 25% | 75% | |
| 20% | 80% | |
| 15% | 85% | |
| 10% | 90% | |
| 5% | 95% | |
| 0% | 100% | Low temperature putty |

Adjustment of Hardening/Rubberized Putty Characteristics:

The softening/rubberized characteristics of color/shape/memory putty can be adjusted by altering the ratios of thermoplastic to gum base. A fixed concentration of optical pigment such as a thermochromic pigment, photochromic pigment, photo-luminescent pigment, glitter, or other color/optical dye/agent is added at a fixed ratio for a desired optical effect.

| Evatane™ Polyvinyl acetate | Protoplast™ Thermoplastic | |
|---|---|---|
| 100% | 0% | Highly rubberized character |
| 95% | 5% | |
| 90% | 10% | |
| 85% | 15% | |
| 80% | 20% | |
| 70% | 30% | |
| 65% | 35% | |
| 60% | 40% | |
| 55% | 45% | |
| 50% | 50% | Medium rubberized character |
| 45% | 55% | |
| 40% | 60% | |
| 35% | 65% | |
| 30% | 70% | |
| 25% | 75% | |
| 20% | 80% | |
| 15% | 85% | |
| 10% | 90% | |
| 5% | 95% | |
| 0% | 100% | Hardened plastic character |

Adjustment of Plastic/Putty Characteristics:

The plastic-like/putty-like characteristics of a color/shape/memory composition can be adjusted by altering the ratios of thermoplastic to putty base. A fixed concentration of optical pigment such as a thermochromic pigment, photochromic pigment, photo-luminescent pigment, glitter, or other color/optical dye/agent is added at a fixed ratio for a desired optical effect.

| Estane 5778™ (TPU) | Protoplast™ Thermoplastic | |
|---|---|---|
| 100% | 0% | Complete molded shape memory (reversible below transition temp.) |
| 95% | 5% | |
| 90% | 10% | |
| 85% | 15% | |
| 80% | 20% | |
| 70% | 30% | |
| 65% | 35% | |
| 60% | 40% | |
| 55% | 45% | |
| 50% | 50% | |
| 45% | 55% | |
| 40% | 60% | |
| 35% | 65% | |
| 30% | 70% | |
| 25% | 75% | |
| 20% | 80% | |
| 15% | 85% | |
| 10% | 90% | |
| 5% | 95% | Complete loss of mold memory (irreversible at melting transition) |
| 0% | 100% | |

Additional Chromic Change Agents and Optical Components Materials:

Color/shape/memory plastics or putties can be modified to contain various concentrations of optical change agents. Optical change agents and stimulating agents can be present in a toothpaste matrix from greater than 50% to as low as 0.01%. More usually, the agents will be present at 50% to 0.1%. Typically, the agents will be added at between 25% and 0.5% and most often between 10% and 1%. The application of interest, desired coloration, dye or pigment intensity and optical density, type of optical change agent, and costing considerations help in determining the concentration to be used.

Alternative thermochromic materials can be utilized including, but not limited to: light-induced metastable state in a thermochromic copper (H) complexChem. Commun., 2002, (15), 1578-1579 under goes a color change from red to purple for a thermochromic complex, [Cu(dieten)2](BF4)2 (dieten=N,N-diethylethylenediamine); encapsulated pigmented materials from Omega Engineering Inc.; bis(2-amino-4-oxo-6-methyl-pyrimidinium) tetrachlorocuprate (II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiro-pyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenyl-benzo[b]thiophene-5,6-dicarboxylic anhydride, and the like. Encapsulated leuco dyes are of interest since they can be easily processed in a variety of formats into a plastic or putty matrix. Liquid crystal materials can be conveniently applied as paints or inks to surfaces of color/shape/memory composites.

Photochromic dyes can find use in a variety of color change mediums and formats. Photochromic materials can include but are not limited to dyes including: 1,3-Dihydro-1,3,3-trimethylspiro[2H-indole-2,3-[3]phenanthr[9,10-b](1, 4)oxazine]; bicyclo [2.2.1]hepta-2,5-diene; benzyl viologen dichloride; 4,4'-bipyridyl; 6-bromo-1',3'-dihydro-1',3',3'-trimethyl-8-nitrospiro[2H; 5-chloro-1,3-dihydro-1,3,3-trimethylspiro[2H-indole-2,3'-(3H)naphth[2,1-b](1,4)oxazine]; 6,8-dibromo-1',3'-dihydro-1',3',3'-trimethylspiro[2H; 1,1'-diheptyl-4,4'-bipyridinium dibromide; 1',3'-dihydro-5'-methoxy-1',3',3'; 1',3'-dihydro-8-methoxy-1',3',3'-trimethyl-6-nitrospiro[2H]; 1',3'-dihydro-1',3',3'-trimethyl-6-nitrospiro[2H-1-benzopyran-2,2'-(2H)-indole]; 1,3-dihydro-1,3,3-trimethylspiro [2H-Indole-2,3'-[3H]naphth[2,1-b][1,4]oxazine]; 1,1'-dimethyl-4,4'-bipyridinium dichloride; 5-chloro-1,3-Dihydro-1,3,3-trimethylspiro[2H-indole-2,3'-(3H)phenanthr[9,10-b](1,4)oxazine]; 5-methoxy-1,3,3-trimethylspiro[indoline-2,3'-[3H]naphtho[2,1-b]pyran]; 2,3,3-trimethyl-1-propyl-3H-indolium iodide and the like.

Photo-luminescent compounds can find use in a variety of color change mediums and formats. Photo-luminescent compounds can include, but are not limited to, a variety, of materials. Greens, green blue and violet can be made with alkaline earth alurninates activated by rare earth ions. By way of example, strontium aluminate can be activated using europium (SrAl03:Eu). Visual wavelengths can include: green at 520 nm, blue-green at 505 nm, and blue at 490 nm. Red and orange colors can be generated with zinc sulfide.

Fluorescent dyes can find use in various product applications and mediums and formats. Fluorescent dye compounds can include, but are not limited to: fluorescein, fluorescein, resourcinolphthalein, rhodamine, imidazolium cations, pyridoimidazolium cations, dinitrophenyl, tetramethylrhodamine and the like. A wide range of fluorescent dyes that can be activated at various wavelengths and emit light at lower wavelengths can be purchased from Sigma-Aldrich (Saint Louis, Mo.) or Molecular Probes (Eugene, Oreg.).

Optical change agents can be added in a micro-particulate powder form, in a pellet-compounded form, in slurries, as a compounded form that was pre-mixed and concentrated with the material it is intended to be added to, added as a colorant in a master batch form, applied to a molded surface of shape changing plastic as a solvent based ink, applied to a surface as an ultra-violet ink and cured with ultra-violet light, applied as an adhesive, applied as a durable label form, laminated, coated, painted, sprayed, dip coated in an ink or coating composition, or any of a variety of printing, coating, or colorant additive formats. Below illustrates a matrix by way of example but not a limitation as to how various combinations and permutations can be utilized:

| Shape | Thermochromic | Photochromic | Photoluminescent | Iridescent |
|---|---|---|---|---|
| X | | | | |
| X | X | | | |
| X | | X | | |
| X | | | X | |
| X | | | | X |
| X | X | X | | |
| X | X | | X | |
| X | | X | X | |
| | X | X | | |
| | | X | X | |
| X | X | | | X |
| X | | X | | X |
| | | X | X | X |
| X | X | X | | X |
| X | | X | X | X |
| | X | X | X | X |
| X | X | X | X | |
| X | X | X | X | X |

Additives:

Additional additives shown to extend the volume, weight, or expanse as well as lower the cost of goods of products made of a color/shape/memory plastic or putty may include, but are not limited to: silicates, diatomaceous earth, sawdust, wood dust, ceramic dust, rubber powder, fiber glass webbing, amorphous materials, glass fibers, fabric, cloth, cheese cloth, netting, screen, cut-out patterned materials, films, sand, pebbles, paper, nylon powder, plastic powder, carbon, talc powder, metal powder, iron powder, aluminum powder, magnetic particles, paramagnetic particles, plastic microparticles, micro-capsules, chalk powder, high melt temperature plastic particles, insoluble inorganic and organic powders, graphite, insoluble organic compounds, colorant pellets, insoluble inorganic salts, uniform cellulose powder, corn starch, cellulose powders, and the like.

Particulate inert extenders are not intended to change the physical nature or the shape changing material. The extenders can be transparent, opaque, have independent optical properties such as thermochromic, photochromic, or luminescent characteristics. High temperature plastics such as nylon or polyesters can be utilized in a powder form and used as extenders. Extenders can include foaming agents that are capable of generating a high volume of entrapped air.

Alternatively additives can be utilized to change or modify a property of a color/shape/memory composition. By way of example, oils, lubricants, surfactants, waxes or the like can be added to a putty to reduce stickiness. Emulsifiers can be added to improve consistency and as an aid for mixing. Fragrances can be added to alter a smell sensation during use. Gum bases may be added to increase pliability. Encapsulating elements may be added to provide a carrier means for adding non-miscible materials.

Shape changing/color changing plastics and putties may be impregnated, laminated, conjoined, permeated, treated onto, dispensed onto, hot melted into, or otherwise integrated into various fabrics, knitted materials, felts, flannel, wire mesh, wire screen, plastic screen, fabric tapes, woven materials and non-woven materials, porous planar and pliable substrates, stretchable nylon, water resistant fabrics, denim, canvas, nylon webbing, or the like. In doing so, the shape/memory/color change material may take on some of the added properties of the compliant substrate. For example, a color/shape/memory plastic can be hot laminated onto a knitted nylon fabric. The plastic will be both strengthened and become more compliant with the included nylon than if the color/shape/memory plastic was comprised without the nylon fabric. Colored, patterned, and lace-like materials can be coated or impregnated with a color/shape/memory plastic to take on the color, pattern, or lace-like characteristics of the fabric. Integration with a fabric or pliable substrate can have the added benefit of reducing pricing and yet increasing intrinsic strength.

Additives can be co-mixed into compositions, coated on compositions, applied as topical treatments or the like depending on the additive and its intended application. For example additives may provide structural integrity through reinforcement. Additives may provide protection against environmental effects such as intense light. Ultraviolet light may cause premature discoloration. Ultraviolet light inhibiting agents such as para-amino-benzoic acid or nano-particulate zinc oxide may be added to reduce photobleaching and promote longer outdoor lifetimes. Chemical resistive agents may be added to improve solvent or chemical resistance. Additives that protect against high-impact may be added as reinforcing agents. Brighteners may be added to improve a color contrast and improve an appearance. Mold releasing agents can be added to the composition to improve release from a forming mold during processing.

Additives will be used at concentrations and percentages that are suitable to meet the intended requirements. In addition, it will be important to add ancillary agents at a level that does not negatively impact the intended functionality of a designed optical/shape/memory change composition. Additives may constitute between 0% to 95% of the total mass of a composition. Usually, additives will constitute 0.01% to 90% mass. More usually, additives will find use between 0.1% and 75%. Typically, additives will be used between 1% and 50% of the total mass.

Molding Processes:

Compression molding can be used with molds that contain high temperature resistant plastic molds, anodized aluminum molds, non-stick coated aluminum, polished stainless steel, Kapton™, Teflon™, ceramic, mold releasing agents coated on molds, molds coated with mold releasing agents. Injection molding can be used where single or multi-cavity molds, vertical molds, horizontal molds, single composition or multi-component molds, complex interlocking molds, hot-runner molds, cold runner molds, or the like can be employed. Blow molding, rotary molding, thermoforming, combination compression-thermoforming, and related molding process can be used where convenient. Stamping, rod or filament drawing, extruding, or other process may be utilized. A wide variety of convention plastic molding process as well as custom molding processes may find use.

Optical Light Guiding Applications:

Optical screens and light sources can be used in connection with optically transmitting shape changeable plastic shaped pieces. Direct optical coupling can be made between the light source of interest and the optically transmitting shape changeable plastic. Light sources can include incandescent, fluorescent, ultraviolet, light emitting diodes, sun light, electroluminescence, cathode ray tubes, back lit liquid crystal displays, high definition television screens, common computer terminals, and a variety of other projected light sources.

Shape changing prisms can be utilized whereby the light guided into and out of prisms can be adjusted but a person or child utilizing the optical shape changing plastic item. Lenses can be created that can be directly or indirectly used to vary the focal effects of a lens made with the optical shape changeable plastic. Fiber optic rods can be created that guide light and images and can be physically softened or hardened into a configuration of interest in order to maximize an effect or optical output. Shape changeable waveguides can be constructed using optically clear shape changeable plastics. Waveguides can find use in electronic and opto-electronic applications.

Holographic imprints can be made in a surface of an optically clear shape changeable plastic. Holograms can be printed on a planar piece, on a contoured piece, or around the circumference of a piece. The hologram can be made to shift appearance under a wide range of contortions due to the shape changeable characteristics of the shape changeable plastic substrate.

Heating/Cooling Sources:

Heating sources can include but are not limited to: solar heating, heating by hand, heating by breath, heating with water, heating with microwaves, heating with radiant heat, heating with integrated heating elements, heating with a blow drier, heating with chemically generated heat, heating with a Peltier plate and the like. Heating processes can include light generated heat whereby an optical source can excite a heat generating pigment in the plastic composite. As light is absorbed, heat is released from the pigment to locally heat the composition where it is illuminated. Non-optically emitting heat radiating nano-composites may find use for generating secondary optical effects in thermochromic pigments.

The following examples are offered by way of illustration and not by way of limitation.

EXPERIMENTAL

Part A.

1. Thermochromic pigment for adding to ink bases or direct addition to shape/memory compositions: A thermochromic pigment composition was prepared by adding a pre-polymerized polydiacetylenic dimeric amide. The dimeric amide was made from dimerizing the diacetylenic acid 5,7-dodecadiynoic acid with ethylene diamine such that two acid groups coupled with a single ethylene diamine to make the diamined. The dimeric amide was purified and polymerized to a stable pigment using ultraviolet light (254 nanometers). The material was readily powderized using a standard high-speed blade grinder. The powderized form could be readily added at various stages of processing of the shape/memory composite.

2. Thermochromic ink composition for coating shape/memory materials: A silk screen printing ink composition was prepared by adding a pre-polymerized polydiacetylenic dimeric amide. The dimeric amide was made from dimerizing the diacetylenic acid 5,7-dodecadiynoic acid with ethylene diamine such that two acid groups coupled with a single ethylene diamine to make the diamined. The dimeric amide was purified and polymerized to a stable pigment using ultraviolet light (254 nanometers). The pre-polymerized diamide was added at a 10% by weight to a general purpose silk screen ink base (Nazdar Ink Corp.). The mixture was mixed to homogeneity and stored for use. At room temperature, the formulated ink appeared magenta in color. Upon cooling, the ink shifted its optical characteristics to a purple/blue color. Upon heating, the ink transitioned to a red/orange color. The formulated wet solvent based ink remained stable and exhibited reversible thermochromic characteristics at room temperature and only irreversibly turned color if heated above 150 F. The ink base when dried retained its reversible thermochromic color change ability up to 250 F.

3. Shape/memory/color changing sheet: A 30° C. shape/memory plastic sheet (0.015 in thickness) was purchased from Bay Materials, Corp. (Menlo Park, Calif.). The sheet was cut to a 6 inch by 9 inch rectangle and kept flattened until use. The sheet was screen printed using the thermochromic general purpose ink composition prepared as Example 2 above. An opaque coating was generated by using multiple screen coating passes using a 240 mesh silk screen with a 8 inch by 10 inch window size. Coating was done on only one side of the sheet. The coating was allowed to dry overnight prior to further use.

The dried coated shape/memory/color changing sheet exhibited strong thermochromic color change and temperature reversibility by cycling temperature above and below 30° C. The sheet was fully pliable and compliant when warmed. Likewise, the sheet turned from a room temperature magenta color to a red/orange color when warmed above 30° C. The sheet began to stiffen and solidify as well as change color to a deep magenta when cooled to 25° C. The sheet retained any shape it was held in during the cooling process. At 20°

C. the sheet became stiff and hardened to a rigid plastic-like character as well as adopting darker purple color.

Both the shape and color change were completely reversible above and below the temperature set points. The shape could be set and reset numerous times. The associated color change served as an excellent indicator that softening was instantly going to occur as well as an interactive and attractive optical effect which added play value to the composition.

4. Shape/memory/color changing fiber: A 30° C. shape/memory plastic fiber was prepared to a diameter of 0.02 inch in diameter. Elongated filaments of a polymeric lactide composition were drawn from a melt. The filaments were pulled at a steady rate and tension such that continuous lengths of filaments (0.02 inch in dia.). The material stiffened immediately after being pulled form the melt. The filaments were spun onto a real for storage. The filaments were coated with the reversible thermochormic ink prepared as described in example 2. After coating and drying, both the shape and color of the coated fiber could be changed by exposure to temperatures above room temperature.

5. Shape/memory/color changing doll hair: 30° C. shape/memory plastic fiber (0.015 in dia.) was purchased from Bay Materials, Corp. (Menlo Park, Calif.). The fiber was cut into 10 inch segments and fixed side-by-side on a 8 inch by 10 inch wooden frame using double stick foam-based tape. The strands were space approximately 3 millimeters apart and kept with tension. The strands were coated with a thin opaque coating using the ink base prepared as in Example 2. Coating was accomplished by brush on both sides of the fibers by coating on one side and then flipping the frame to coat on the other side. After drying for 6 hours at room temperature, the strands were removed by cutting immediately along the attachment points. The final coated fiber strands were 7.5 inches in length.

A bundle of approximately 400 strands were grouped and attached together at one end by melting the adjacent strands using a heated Teflon coated surface (350° F.). The strand group had the appearance of toy doll hair. The hair could be shape and color changed by exposure to temperatures above 90° F. The stiff strands would immediately soften and change from a room temperature magenta color to a red/orange color. Continued softening and color brightening to an orange yellow color occurred when the exposed temperature was raised to above 100° F.

The hair bundle could be readily molded into any shape or braided pattern when warmed and manipulated. The shape or braided pattern could be frozen in shape by lowering the ambient temperature to 70 F or lower. Shape freezing could be accomplished by passing cool air over the bundle or by submersing the bundle in cooled water. Both the shape and color simultaneously changed upon warming and cooling. The shape and color change were completely reversible over repeated cycles.

6. Woven shape, memory, and color changing fabric: Shape/memory/color changing fabric was prepared using shape/memory/color changing fibers prepared as described in Example 5 above. A fabric was prepared using a simple loom. A 6 inch by 6 inch fabric sheet was prepare and stitch sealed along each of the 4 edges. The shape/memory/color change fabric sheet was further secured by heat sealing the oven strands along the 4 edges of the fabric sheet.

The fabric sheet could be readily molded into any shape or configuration when warmed and manipulated. The shape or configuration could be frozen in shape by lowering the ambient temperature to 70 F or lower. Shape freezing could be accomplished by passing cool air over the fabric sheet or by submersing the sheet in cooled water. Both the shape and color simultaneously changed upon warming and cooling. The shape and color change were completely reversible over repeated cycles.

7. Shape/memory/color changing Epoxy resin: Shape/memory/color changing epoxy resin was prepared by adding the thermochromic pigment described in Example 1 at a ration of 5% pigment by weight of 95% weight Epoxy (Devcon 5 Minute Epoxy, All Purpose, ITW Performance Polymers Consumer Division). The thermochromic pigment was added directly to the fast drying Epoxy component in a highly powderized form. The pigment was thoroughly mixed. The mixture could be stored indefinitely at room temperature prior to mixing with the resin's hardener component. For use, the two components of the Epoxy resin were added in equal amounts and mixed thoroughly.

When the two components were mixed, the thermochromic pigment served as an indicator of uniformity of mixing during the mixing process. As the two components were mixed, the thermochromic pigment changed color from a magenta color to a red transition as the exothermic polymerization reaction occurred within the Epoxy resin. The color continued to progress to a bright orange color during the prescribed 5 minute time frame specified by the Epoxy resin manufacturer. A bright yellow orange color occurred in the mixture immediately prior to the resin solidifying. After solidification and cooling, the composite color returned to a magenta color at room temperature (72 F) and reversibly to a blue/purple color below 60 F.

Adjusting the ratios of Epoxy to hardener could be used to adjust the final stiffness of the polymerized resin. Ratios of hardener to Epoxy greater than 50% hardener resulted in stiffer composites with fast shape memory characteristics. Ratios of hardener to Epoxy less than 50% hardener resulted in less rigid composites with slower shape memory characteristics.

The multi-element shape/memory/color change Epoxy resin could be molded into a wide variety of initial shapes, configurations, geometries, sheet forms, rod forms, strand forms, patterns and the like. Each shape could be pre-designed for an initial shape which could be reformed upon heating, holding the shape and subsequent cooling. Upon re-heating, the Epoxy resin would return to its original shape.

8. Doll possessing shape/memory/color changing hair and body: A play doll possessing both body and hair shape/memory/color change characteristics was prepared. A mold was prepared using a commercially available room temperature vulcanization molding material. The mold was made from a small plastic figure doll 3 inch in height and 0.5 inch in width. The doll was molded using the thermochromic shape/memory/color change Epoxy resin described in Example 7, above. The Epoxy resin was used at a ratio of 50% hardener to 50% Epoxy. The molded doll, once hardened was modified with a 0.25 inch in diameter hole at the top of the doll's head.

The doll was attached with a 7.5 inch segment of bundled shape/memory/color change hair described in Example 5. The blunt connected end of the hair bundle was glued in place by attaching the bundle end inside of the drilled hole in the doll head.

The hair bundle and doll could be readily molded into any shape or braided pattern when warmed and manipulated. The shape or braided pattern could be frozen in shape by lowering the ambient temperature to 70 F or lower. Shape freezing could be accomplished by passing cool air over the hair bundle and doll or by submersing it into cooled water.

Both the shape and color simultaneously changed upon warming and cooling. The shape and color change were completely reversible over repeated cycles.

9. Shape/memory/color shifting tooth brush handle: A toothbrush handle comprising of a shape changing material, a relief material to enhance shape memory and a thermochromic material indicating the temperature transition was prepared in a molded form. A 30 C shape memory material was purchased from Bay Materials, LLC. (Menlo Park, Calif.). The thermochromic pigment was prepared according to Example 1. A relief material with good spring back characteristics was prepared with 0.30 inch thick polyester sheet stock.

A toothbrush head was removed from a standard retail tooth brush. The cut end was slotted to facilitate attachment to the shape/memory/color shifting handle. An aluminum mold was prepared using standard machining techniques. The mold was equipped with ejector pins to remove the mold piece after molding. The mold was constructed to adapt the toothbrush head in a position that would lock the toothbrush head with the molded handle. The mold also included a design to accept a die cut pattern of the relief material shaped the same as the final toothbrush handle. The relief material was die cut with a 30% smaller profile than the mold such that the molded shape changing material would completely encase the relief material. The die cut relief material was accurately placed in the mold along with the toothbrush head.

Prior to molding, the polydiacetylenic pigment described in Example 1 blended with a granulated form of the 30 C shape changing material. The pigment was added at a concentration of 2% by weight of the shape changing material. The shape memory material mixed with thermochromic pigment was pre-heated and blended at 280 F. The blended material was worked into the mold and the material pressed under pressure to flow throughout the mold cavity. Pressures of 2000 pounds/square inch were applied during the heating/molding process. The mold and composite were cooled to room temperature prior to removal. The finished shape/memory/color shifting toothbrush was ejected from the mold using the ejector pins. The final product looked like a standard toothbrush possessing a magenta color at room temperature.

The brush maintained it shape and color at room temperature (+/−2 F). The shape could be frozen in shape by lowering the ambient temperature to 70 F or lower. Shape freezing could be accomplished by passing cool air over the brush or by submersing it in running tap water. Both the shape and color simultaneously changed upon warming the brush handle under warm running tap water. The shape and color change were completely reversible over repeated cycles.

The shape/memory/color change handle had the additional advantage of being bent and shaped such that the handle could be self-standing. By warming and twisting the handle end, a small circular pattern perpendicular to the length of the brush could be created and frozen in shape. The shape changed end provide a stand which permitted the brush to stand upright on its own and thus not requiring a holder for the brush.

10. Adhesives containing reversible thermochromic C14EDAC14 were prepared using a commercially available adhesive resin (39% C0472 from Landec). Polymerized magenta C14EDAC14 was mixed at concentrations ranging from 0.01% to 50% by weight. The resin was spread onto papers and solid supports and dried to form a pressure sensitive adhesive with distinct thermochromic color transition properties resulting from the polymeric C14EDAC14. Adhesives resins were dried either at room temp. or up to 220° F. The thermochromic adhesive was magenta at room temp, blue below room temp., and transitioned to red at about 90-100° F. The color change further advanced to an orange color at a 120° F. and subsequently to a yellow color at 200° F. The dried adhesive thermochromic composition exhibited reversible properties up to 250-290° F. The adhesive can be mixed with a variety of other compositions to provide for unique pressure sensitive adhesive applications.

11. Plastic toy horse possessing shape/memory/color changing hair and mane:
12. Electra-conductive shape/color change fibers for hair and woven materials:
13. Thermoelectric patterning for inducing color and shape from 2D object to 3D object:
14. Embedded translucent holographic image in transparent shape/memory material
15. Die cut shape/memory/color changing bath toy:
16. Heat shrink shape/color change film with thermoelectric heating element for induction:
17. Electo-heat responsive shape/color changing toy configuration:
18. Electro-heat responsive printed color/shape changing patterns on heat shrink film:
19. Color changing bi-directional heat shrink plastics (e.g. Shrinky Dink™ patterns:
20. Printed edible sugar laminate layered on pre-molded shape changing plastic:
21. Electro-thermal hair brush for inducing color/shape change in color/shape/memory change hair:
22. Shape/memory/color changing food dish formed from thermally annealed sheet:
23. Area on thermoformed packaging which changes shape and color when put on hot water cup:
24. Optical grade self-adjustable lenses for eye glasses and visual effects:
25. Edible sugar layer which changes shape and graphics upon heating:
26. Conductive removable wound or tissue dressing:
27. Heat shrink for building materials and facilitating closures:
28. Color/shape changing/melting Crayons™:
29. Cold storage, collapsible storage containers, collapsible consumer products:
30. Epoxy-based resins found use as a shape/memory component for the plural composition:
31. Color/shape/memory changing pop-up books:
Part B.

Example 1

Thermochromic color/shape/memory plastic composition: A thermochromic color and shape changing plastic composition with combined shape memory properties was formulated using a the thermoplastic polyurethane Estane™ 5778 (Noveon Corporation, Cleveland Ohio) and 2.5% by weight powdered thermochromic pigment (Keystone Aniline Corporation, Chicago Ill.).

Small batches were prepared using 250 grams thermoplastic and 6.25 grams thermochromic pigment. A rounded bottom Pyrex™ dish (1000 ml. volume) was used for mixing. The bowl could be coated with a lubricating oil to reduce adhesion on the bowl sides. For compression molding applications, the thermoplastic was melted in a microwave oven for 2-4 minutes and mixed to a viscous flowing consistency. The thermochromic powder was added while mixing to a uniform opacity. Complete mixing was accomplished over several minutes. Repeated heating by microwave for 30 to 60 seconds was done to ensure a molten consistency.

Large batches were prepared using identical ratios of thermoplastic to thermochromic colorant as described above. 25 kilogram batches were prepared in a heated industrial mixing vat. The vat was equipped with a uniform heating jacket and an industrial grade mixing implement. Pre-dried pellet stock of the thermoplastic were added to the pre-heated vat. A temperature between 350° F. and 400° F. was maintained. Mixing was initiated after a uniform molten state was achieved. Mixing was maintained at a slow but steady state. 625 grams thermochromic colorant was added slowly to the mixing batch and mixing was maintained for 10 to 30 minutes. The viscous molten mixture was periodically conditioned by additional physical displacement using a large spatula.

The finalized molten mixtures could be used directly in the molten state by transfer in-line to accompanying production molding dies and equipment or the mixture could be separated into usable portions and solidified and pre-shaped into convenient ingots for storage, inventory, and later use.

Example 2

Photochromic color/shape/memory plastic composition: A photochromic color and shape changing plastic composition with combined shape memory properties was formulated using the thermoplastic polyurethane Estane™ 5778 (Noveon Corporation, Cleveland, Ohio) and 2.5% by weight powdered photochromic pigment (Color Change Corporation, Streamwood, Ill.).

Small batches were prepared using 250 grams thermoplastic and 6.25 grams photochromic pigment. A rounded bottom Pyrex™ dish (1000 ml. volume) was used for mixing. The bowl could be coated with a lubricating oil to reduce adhesion on the bowl sides. For compression molding applications, the thermoplastic was melting in a microwave oven for 2-4 minutes and mixed to a viscous flowing consistency. The photochromic powder was added while mixing to a uniform opacity. Complete mixing was accomplished over several minutes. Repeated heating by microwave for 30 to 60 seconds was done to ensure a molten consistency.

Large batches were prepared using identical ratios of thermoplastic to photochromic colorant as described above. 25 kilogram batches were prepared in a heated industrial mixing vat. The vat was equipped with a uniform heating jacket and an industrial grade mixing implement. Pre-dried pellet stock of the thermoplastic were added to the pre-heated vat. A temperature between 350° F. and 400° F. was maintained. Mixing was initiated after a uniform molten state was achieved. Mixing was maintained at a slow but steady state. 625 grams photochromic colorant was added slowly to the mixing batch and mixing was maintained for 10 to 30 minutes. The viscous molten mixture was periodically conditioned by additional physical displacement using a large spatula.

The finalized molten mixtures could be used directly in the molten state by transfer in-line to accompanying production molding dies and equipment or the mixture could be separated into usable portions and solidified and pre-shaped into convenient ingots for storage, inventory, and later use.

Example 3

Multi-format photochromic/thermochromic color/shape/memory plastic composition: A photochromic/thermochromic color and shape changing plastic composition with combined shape memory properties was formulated using a the thermoplastic polyurethane Estane™ 5778 (Noveon Corporation, Cleveland Ohio), 2.5% by weight powdered photochromic pigment (31° C. magenta Color Change Corporation, Streamwood Ill.), and 2.5% by weight powdered thermochromic pigment (Keystone Aniline Corporation, Chicago Ill.).

Small batches were prepared using 250 grams thermoplastic, 6.25 grams photochromic pigment and 6.25 grams thermochromic pigment. A rounded bottom Pyrex™ dish (1000 ml. volume) was used for mixing. The bowl could be coated with a lubricating oil to reduce adhesion on the bowl sides. For compression molding applications, the thermoplastic was melted in a microwave oven for 2-4 minutes and mixed to a viscous flowing consistency. The photochromic and thermochromic powders were added while mixing to a uniform opacity. Complete mixing was accomplished over several minutes. Repeated heating by microwave for 30 to 60 seconds was done to ensure a molten consistency.

Large batches were prepared using identical ratios of thermoplastic to photochromic and thermochromic colorants as described above. 25 kilogram batches were prepared in a heated industrial mixing vat. The vat was equipped with a uniform heating jacket and an industrial grade mixing implement. Pre-dried pellet stock of the thermoplastic were added to the pre-heated vat. A temperature between 350° F. and 400° F. was maintained. Mixing was initiated after a uniform molten state was achieved. Mixing was maintained at a slow but steady state. 625 grams photochromic and 625 grams thermochromic colorants were added slowly to the mixing batch and mixing was maintained for 10 to 30 minutes. The viscous molten mixture was periodically conditioned by additional physical displacement using a large spatula.

The finalized molten mixtures could be used directly in the molten state by transfer in-line to accompanying production molding dies and equipment or the mixture could be separated into usable portions and solidified and pre-shaped into convenient ingots for storage, inventory, and later use. The final composition comprised and exhibited all of the expected shape change, thermochromic and photochromic characteristics expected.

Example 4

Photo-luminescent (glow-in-the-dark) color/shape/memory plastic composition: A photo-luminescent color and shape changing plastic composition with combined shape memory properties was formulated using a the thermoplastic polyurethane Estane™ 5778 (Noveon Corporation, Cleveland Ohio) and 15% by weight powdered photo-luminescent pigment (Glow Incorporated, Severn Md.).

Small batches were prepared using 250 grams thermoplastic and 37.5 grams photo-luminescent pigment. A rounded bottom Pyrex™ dish (1000 ml. volume) was used for mixing. The bowl could be coated with a lubricating oil to reduce adhesion on the bowl sides. For compression molding applications, the thermoplastic was melted in a microwave oven for 2-4 minutes and mixed to a viscous flowing consistency. The photo-luminescent powder was added while mixing to a uniform opacity. Complete mixing was accomplished over several minutes. Repeated heating by microwave for 30 to 60 seconds was done to ensure a molten consistency.

Large batches were prepared using identical ratios of thermoplastic to photo-luminescent colorant as described above. 25 kilogram batches were prepared in a heated industrial mixing vat. The vat was equipped with a uniform heating jacket and an industrial grade mixing implement. Pre-dried pellet stock of the thermoplastic were added to the pre-heated vat. A temperature between 350° F. and 400° F. was maintained. Mixing was initiated after a uniform molten state was achieved. Mixing was maintained at a slow but steady state. 3.75 kilograms photo-luminescent colorant was added slowly to the mixing batch and mixing was maintained for 10 to 30 minutes. The viscous molten mixture was periodically conditioned by additional physical displacement using a large spatula.

The finalized molten mixtures could be used directly in the molten state by transfer in-line to accompanying production molding dies and equipment or the mixture could be separated into usable portions and solidified and pre-shaped into convenient ingots for storage, inventory, and later use.

Example 5

Multi-format photochromic/photo-luminescent optical/ shape/memory plastic composition: A photochromic and photo-luminescent optical and shape changing plastic composition with combined shape memory properties was formulated using a the thermoplastic polyurethane Estane™ 5778 (Noveon Corporation, Cleveland Ohio), 2.5% by weight powdered photochromic pigment (31° C. magenta Color Change Corporation, Streamwood Ill.), and 10% by weight powdered photo-luminescent pigment (Glow Incorporated, Severn Md.).

Small batches were prepared using 250 grams thermoplastic, 6.25 grams photochromic pigment and 37.5 grams photo-luminescent pigment. A rounded bottom Pyrex™ dish (1000 ml. volume) was used for mixing. The bowl could be coated with a lubricating oil to reduce adhesion on the bowl sides. For compression molding applications, the thermoplastic was melted in a microwave oven for 2-4 minutes and mixed to a viscous flowing consistency. The photochromic and photo-luminescent powders were added while mixing to a uniform opacity. Complete mixing was accomplished over several minutes. Repeated heating by microwave for 30 to 60 seconds was done to ensure a molten consistency.

Large batches were prepared using identical ratios of thermoplastic to photochromic and thermochromic colorants as described above. 25 kilogram batches were prepared in a heated industrial mixing vat. The vat was equipped with a uniform heating jacket and an industrial grade mixing implement. Pre-dried pellet stock of the thermoplastic were added to the pre-heated vat. A temperature between 350° F. and 400° F. was maintained. Mixing was initiated after a uniform molten state was achieved. Mixing was maintained at a slow but steady state. 625 grams photochromic and 3.75 kilogram photo-luminescent colorants were added slowly to the mixing batch and mixing was maintained for 10 to 30 minutes. The viscous molten mixture was periodically conditioned by additional physical displacement using a large spatula.

The finalized molten mixtures could be used directly in the molten state by transfer in-line to accompanying production molding dies and equipment or the mixture could be separated into usable portions and solidified and pre-shaped into convenient ingots for storage, inventory, and later use. The final composition comprised and exhibited all of the expected shape change, photochromic, and photo-luminescent characteristics expected. In day light, a region illuminated with ultraviolet light (e.g. a 400 nanometer light emitting diode pen light) becomes colored from a non-colored plastic background to a deeply colored pattern in the illuminated areas. While the photochromic effect dissipates within 1-2 minutes, the same illuminated area would emit an optical glow in dark conditions.

Example 6

Low temperature thermochromic color/shape/hardening putty composition: A thermochromic color and shape-changing putty composition with combined reversible shape hardening properties was formulated using a the gum base Dreyco™ base (L.A. Dreyfus Company, Edison N.J.), the thermoplastic composition Protoplast™ (WRF/Aquaplast Corporation, Wyckoff N.J.) and 4% by weight powdered thermochromic pigment (Keystone Aniline Corporation, Chicago Ill.).

Batches were prepared using a ratio of 2.5 parts Dreyco™ base: 1 part Protoplast™ thermoplastic: 1% by total weight powdered thermochromic pigment. Pellets of the Dreyco™ base were rinsed in warm water and allowed to soften in water at 120° F. for 10 minutes. The bulk was aggregated and mixed into a uniform dough-like consistency. The bulk of Dreyco™ base was kept warm while Protoplast™ thermoplastic pellets were heated by microwave until a viscous consistency that matched that of the warmed Dreyco™ base. The powdered thermochromic pigment was added directly to the molten thermoplastic and mixed until it was uniformly dispersed. The Dreyco™ base and mixed thermoplastic and thermochromic pigment were combined and uniformly mixed. The mixture was periodically warmed either by microwave or with 120° F. water to ensure a softened state during mixing.

The finalized softened mixture could be used directly in the softened state by transfer in-line to accompanying production molding dies and equipment or the mixture could be separated into usable portions and solidified and pre-shaped into convenient ingots for storage, inventory, and later use.

Example 7

Low temperature photochromic color/shape/hardening putty composition: A photochromic color and shape changing putty composition with combined reversible shape hardening properties was formulated using a the gum base Dreyco™ base (L.A. Dreyfus Company, Edison N.J.), the thermoplastic composition Protoplast™ (WRF/Aquaplast Corporation, Wyckoff N.J.) and 4% by weight powdered photochromic pigment (Color Change Corporation, Streamwood Ill.).

Batches were prepared using a ratio of 2.5 parts Dreyco™ base: 1 part Protoplast™ thermoplastic: 1% by total weigh weight powdered photochromic pigment. Pellets of the Dreyco™ base were rinsed in warm water and allowed to soften in water at 120° F. for 10 minutes. The bulk was aggregated and mixed into a uniform dough-like consistency. The bulk of Dreyco™ base was kept warm while Protoplast™ thermoplastic pellets were heated by microwave until a viscous consistency that matched that of the warmed Dreyco™ base. The powdered photochromic pigment was added directly to the molten thermoplastic and mixed until it was uniformly dispersed. The Dreyco™ base and mixed thermoplastic and photochromic pigment were combined and uniformly mixed. The mixture was periodically warmed either by microwave or with 120° F. water to ensure a softened state during mixing.

The finalized softened mixture could be used directly in the softened state by transfer in-line to accompanying production molding dies and equipment or the mixture could be separated into usable portions and solidified and pre-shaped into convenient ingots for storage, inventory, and later use.

Example 8

Low temperature photo-luminescent color/shape/hardening putty composition: A photo-luminescent color and shape changing putty composition with combined reversible shape hardening properties was formulated using a the gum base Dreyco™ base (L.A. Dreyfus Company, Edison N.J.), the thermoplastic composition Protoplast™ (WRF/Aquaplast Corporation, Wyckoff N.J.) and 15% by weight powdered photo-luminescent pigment (Glow Incorporated, Severn Md.).

Batches were prepared as above in examples "Low temperature photochromic color/shape/hardening putty composition". The finalized softened mixture could be used directly in the softened state by transfer in-line to accompanying production molding dies and equipment or the mixture could be separated into usable portions and solidified and pre-shaped into convenient ingots for storage, inventory, and later use.

Example 9

High temperature thermochromic, photochromic or photo-luminescent color/shape/hardening putty compositions: A thermochromic, photochromic, or photo-luminescent color and shape changing putty composition with combined reversible shape hardening properties was formulated using the thermoplastic composition Protoplast™ (WRF/Aquaplast Corporation, Wyckoff N.J.) and 4% by weight powdered thermochromic pigment (Keystone Aniline Corporation, Chicago Ill.); 4% by weight powdered photochromic pigment (Color Change Corporation, Streamwood Ill.); or 15% by weight powdered photo-luminescent pigment (Glow Incorporated, Severn Md.).

Batches were prepared as above in examples "Low temperature thermochromic color/shape/hardening putty composition". The finalized softened mixture could be used directly in the softened state by transfer in-line to accompanying production molding dies and equipment or the mixture could be separated into usable portions and solidified and pre-shaped into convenient ingots for storage, inventory, and later use.

Example 10

Pressure molded optical effect thermochromic, photochromic, photo-luminescent color/shape/memory changing plastic sheets and surface patterned items: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition".

Pre-sized amounts of individual optical/shape/memory plastic formulated mixtures were brought to a soft semi-molten state. A molten pre-sized amount was placed on a non-stick mold surface. The mold surface was either patterned with a surface relief pattern that was to be imprinted on into the final product or the surface was a flat surface for plain sheet preparation. The mold was pre-warmed to 300° F. using an internal electrical heating element. A second pre-heated mold surface was oriented directly above the bottom plate surface and positioned with a 30 ton pneumatic actuated press.

The semi-molten plastic was compressed using the actuated pneumatic press. The mold and press were designed to make complete contact between the upper mold surface and lower mold surface. Excess molten plastic was allowed to escape through guided troughs. Compression was accomplished using a 30 seconds molding cycle. After compression, the top and bottom mold plates and compressed plastic were removed from the press and allowed to rapidly cool with either running water or a stream of cold air. The mold plates were separated and the molded plastic item removed and trimmed.

Example 11

Direct pressure molded optical effect thermochromic, photochromic, photo-luminescent color/shape/memory changing plastic structures: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition".

Pre-sized amounts of individual optical/shape/memory plastic formulated mixtures were brought to a soft semi-molten state. A molten pre-sized amount was placed on a non-stick mold surface as in the example "Pressure molded optical effect thermochromic, photochromic, photo-luminescent color/shape/memory changing plastic sheets and surface patterned items". Three-dimensional mold plates were machined such that the mold plate exactly mirrored the bottom plate. Mold cavities were created to provide a $25/1000$ inch spacing between the top plate and the bottom plate throughout each impression structure. Escape channels were created within the mold surface to provide for channeling excess molten plastic. The mold was pre-warmed to 300° F. using an internal electrical heating element. Mold plates were positioned with a 30 ton pneumatic actuated press.

The semi-molten plastic was compressed using the actuated pneumatic press. The mold and press were designed to make complete contact between the upper mold surface and lower mold surface. Excess molten plastic was allowed to escape through the guided escape channels. Compression was accomplished using a 30 to 60 seconds molding cycle. After compression, the top and bottom mold plates and compressed plastic were removed from the press and allowed to rapidly cool with either running water or a stream of cold air. The mold plates were separated and the molded plastic item removed and trimmed.

Doll figures, faces, characters, dimensional shapes, action figures, cartoon figures and shapes and the like were machined for molding. Multiple repeats of molded features were machined into the mold to ensure the maximum number of molded features were produced per cycle. Care was taken to ensure adequate filling of the mold cavities. Initially, the top and bottom mold pieces was brought in contact with the molten plastic and slowly compressed at specified rates during compression to ensure cavity filling.

Final thermoformed pieces retained their thermochromically active, photochromically active, or photo-luminescently active properties. After thermoforming, the molded items were cut out either by hand or using a die cutting process. Final items exhibited complete intended plural shape and optical properties for the representative sheet materials utilized.

Example 12

Thermoformed thermochromic color/shape/memory changing plastic bath toys, figures, and play pieces using planar sheets: Optical effect color/shape/memory plastic sheets were prepared from batches made in accordance with examples above "Thermochromic color/shape/memory plastic composition"; "Photochromic color/shape/memory plastic composition"; or "Photo-luminescent (glow-in-the-dark) color/shape/memory plastic composition" and in accordance with the example "Pressure molded optical effect thermochromic, photochromic, photo-luminescent color/shape/memory changing plastic sheets and items" above.

Planar pressure formed sheets (20/1000 inch thick) were shaped using standard thermoforming processes. Thermoforming molds were machined using aluminum mold making stock. Doll figures, faces, characters, dimensional shapes, action figures, cartoon figures and shapes and the like were machined for molding. Multiple repeats of molded features were machined into the mold to ensure the maximum number of molded features were produced per cycle. 12 inch by 12 inch sheets were thermoformed using 4 repeat unit molds to yield 4 items per cycle. The sheets were conditioned at 250° F. and rapidly thermoformed to ensure sagging.

Final thermoformed pieces retained their thermochromically active, photochromically active, or photo-luminescently active properties. After thermoforming, the molded items were cut out either by hand or using a die cutting process. Final items exhibited complete intended plural shape and optical properties for the representative sheet materials utilized.

Example 13

Optical glow rods possessing plural shape changeable properties, optical clarity and light diffusion properties: Planar sheets, 2 to 8 mm thick in increments of 1 mm, with shape memory properties were formulated using a the thermoplastic polyurethane Estane™ 5778 (Noveon Corporation, Cleveland Ohio) 0.01%-0.05% by weight finely particulate mica (shimmer powder) was either added or not to enhance light diffusion. Molding was accomplished using a planar mold configuration described in the example above: "Pressure molded optical effect thermochromic, photochromic, photo-luminescent color/shape/memory changing plastic sheets and surface patterned items".

Sheets were prepared with smooth top and bottom surfaces. Finished sheets were die cut or cut with a hot knife to yield strips with a width equal to the thickness of a particular sheet. Cut pieces were finished to have smooth polished edges similar to the smooth finish on the top and bottoms. Strips were sectioned into 6, 8, 10, or 12 inch lengths. Illumination of the end, side, or top of a strip with a variety of intense and focused light sources resulted in an evanescent glow throughout the strip. Strips containing a low percentage of optical effect pigment gave a more uniform and intense glow than those strips without pigment.

Other shapes were formed using molding features and or extrusion. Cross-sectional circular, angular, triangular, pentagon shaped, hexagonal shaped or other geometrical cross-sectional designs were molded. In each case, directional rods retained their shape change and optical effect. Light directed at essentially any angle could be used to cause a glow-like characteristic to the rod types.

Example 14

Illumination surface for light transmission into and through shape changeable optical plastic items: An illumination system comprised with optical glow rods prepared in example "Optical glow rods possessing plural shape changeable properties, optical clarity and light diffusion properties" above. An illumination pad with a back light and opaque surface cover was developed. The opaque surface was designed with a refractive index that blocks light in the dry state. When hydrated with water or an index matching medium, light could escape from the back lit panel. Light could only escape on areas of the opaque surface cover that have been contacted by an indexing medium (water).

Illumination can be enhanced and directed using wetted optical glow rods placed on the opaque surface cover. The wetted rod side directly conducts light through the opaque layer and into the rod causing the rod to appear to glow. Shape changeable glow rods can be shaped and modeled to create various patterns, figures, messages, and designs. A shape changeable glow rod can initially be molded to desired planar configuration. When the rod is wetted along its side and placed on the opaque darkened surface, light will be transmitted through the layer due to index matching of water and the rod will be selectively illuminated in the pre-determined shape that the rod had been molded to.

Shape changeable glow rods provide a three-dimensional relief appearance on the illumination pad. The optical effect can be modulated by repositioning or remolding a shape changeable light transmitting glow rod. Glow rods can be utilized with different optical components including fluorescent dyes, glitters, dyes with optical clarity for changing the rods color, glow-in-the-dark pigments, iridescent pigments and the like.

Example 15

Drawn optical effect thermochromic, photochromic, photo-luminescent color/shape/memory changing plastic strands, filaments, and doll hair: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition".

Pre-sized amounts of individual optical/shape/memory plastic formulated mixtures were brought to a soft semi-molten state in a temperature controlled heating jacket. The temperature was adjusted to ensure uniform viscosity and mixing. Molten mixtures were maintained between 300° F. and 350° F. Fibers were drawn from the molten mixture by initially contacting the mixture surface, pulling a filament to a spindle and maintaining a constant rotational rate for the spindle to draw the filament. The spindle was kept at a fixed distance from molten plastic surface (3 feet). The distance provided adequate time for the plastic to harden for bundling on the spindle. Typically pulling velocities were maintained at between 10 to 100 feet per minute. Pulling velocities, molten temperatures, cooling distances and related parameters could be adjusted accordingly to produce thin or thickened strands, filaments, or hair product.

Final drawn filament compositions retained their thermochromically active, photochromically active, or photo-luminescently active properties. After formation, the filaments items were bundled and cut from doll hair, re-wound for rooting into plastic doll heads or stored for various toy applications. Finished filaments and hair items exhibited complete intended plural shape and optical properties for the representative sheet materials utilized.

Physical properties of the optical effect thermochromic, photochromic, photo-luminescent strands, filaments, and doll hair compositions could be modified for particular applications, By way of example, other plastic that provide increased pull strength could be added to provide additional stability during the doll hair rooting process. Lubricants could be added to reduce sticking between strands. Other physical properties pertaining to processing, manufacturing and functionality could be adjusted accordingly depending on the application of interest.

Example 16

Sand/plastic compositions comprising optical effect thermochromic, photochromic, or photo-luminescent color/shape/memory changing properties: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition".

Pre-sized amounts of individual optical/shape/memory plastic formulated mixtures were brought to a soft semi-molten state in a temperature controlled heating jacket. Washed clean fine grain sand was added from between 1% by volume to 50% by total volume. The sand was added in slowly and mixed thoroughly to ensure complete coverage of all sand particulate with the thermoplastic composition.

Final compositions retained their thermochromically active, photochromically active, or photo-luminescently active properties. The added sand provided a grainy finish. The encapsulated sand did not adversely affect the properties of the encapsulating plastic or chromic change agents. After formation, pre-determined amounts of the final formulations were proportioned for use in molding applications similar to those in the above example "Pressure molded optical effect thermochromic, photochromic, photo-luminescent color/shape/memory changing plastic sheets and surface patterned items".

Example 17

Encased thermochromic, photochromic, and photo-luminescent low temperature color/shape/memory putties for impression making applications: A vinyl encased low temperature putty was developed as a re-shapeable color changing molding pad. Low temperature color/shape/memory putties were prepared as in the examples above "Low temperature photochromic color/shape/hardening putty composition"; "Low temperature thermochromic color/shape/hardening putty composition"; and Low temperature photo-luminescent color/shape/hardening putty composition".

The compositions were prepared using only the Dreyco™ gum base and chromic change agent and excluded the thermoplastic Protoplast™. The putty compositions were prepared without the thermoplastic to provide an even lower temperature putty format (90-100° F.) than the example using the thermoplastic (110-120° F.). Hardened color/shape/memory putty pieces (25 gram) were placed in partially heat sealed vinyl pouches ($10/1000$ inch thick clear flexible vinyl stock). The pouch was sealed on 3 sides. The putty was warmed, spread evenly throughout the pouch to avoid entrapped air, and then completely heat sealed into the vinyl pouch laminate. The final filled pouch was flattened and cooled to room temperature. The final size was a flat planar configuration approximately 3 millimeters thick and 10 by 10 centimeters squared.

Final encased putty compositions retained their thermochromically active, photochromically active, or photo-luminescently active properties as well as the shape memory properties upon warming and cooling. Impression formation was accomplished by warming a filled sealed pouch by microwave or in warm water (100° F. for 3 minutes). An impression resulted when the fill planar pouch was pressed by hand or with a molding implement to create pattern. The displaced color change putty left a clear window in the impression area. Upon cooling, the impression area retained its molded configuration and the surrounding putty filled areas returned to their original reversible color change state. The pieces were found to be fully re-usable and re-moldable for on-going impression making and use.

Various impression making pieces were used to create pre-determined shapes including: animal shapes, insect shapes, faces, figures, numbers, letters, messages, pictures, diagrams, signatures, symbols, story boards, cartoons, cartoon characters, and a variety of branded and unbranded features. Final impressions could be changed or recreated during play and use.

Example 18

Encased thermochromic, photochromic, or photo-luminescent viscous color/shape/memory fluids and writing methods: A clear vinyl encased viscous fluid comprising a thermochromic, photochromic, or photo-luminescent optical effect pigment and a viscous aqueous solution was prepared as a writing, messaging, and activity unit. 2.5% by weight powdered thermochromic pigment (Keystone Aniline Corporation, Chicago Ill.) was utilized for a thermochromic version. 3% by weight powdered photochromic pigment (Color Change Corporation, Streamwood Ill.) was utilized for a photochromic version. 10% by weight powdered photo-luminescent pigment (Glow Incorporated, Severn Md.) was utilized for a glow-in-the-dark version. The viscous aqueous solution was prepared using a concentrated solution of water titrated with highly powdered corn starch.

Solutions containing an adjusted flowing viscous mixture of corn starch and water was admixed with powdered forms of either the thermochromic pigment, photochromic pigment or photo-luminescent pigment. Mixtures were added to clear flexible vinyl pouches sealed on 3 sides (approximately 20 ml fluid, $10/1000$ inch thick clear flexible vinyl). The pouches were purged of air and completely sealed using a standard packaging heat sealer.

Final encased thermochromic, photochromic, and photo-luminescent viscous solutions retained all of their optical properties respectively. The encased solutions retained a shape-changeable pliability and malleability when pressed or contorted. The original shape of the pouch would slowly revert to the original planar configuration after distortion and left further un-perturbed. The optical change versions provided a convenient surface for creating and writing messages, codes, symbols and the like that could be made to appear and then dissipate over several minutes. By way of example, the photochromic-encased version could be conveniently written on using a 400 nanometer light emitting diode pen light. Written matter immediately appears as the pen light passes over the encased surface. The written matter dissipates within 1-2 minutes or immediately by changing the shape or distorting the pouch surface. In either case, the method and encasement completely reverses and can be re-used systematically.

Example 19

Color/shape/memory putty laminate coating on pre-molded plastic doll head: Moldable coating/laminating layers comprising high temperature thermochromic, photochromic, or photo-luminescent color/shape/hardening putties were applied to a pre-molded plastic doll heads. The coatings were made using color/shape/hardening putties as in the above example "High temperature thermochromic, photochromic or photo-luminescent color/shape/hardening putty compositions".

A 5 inch tall plastic doll head was compression-laminated using a heated pliable sheet of high temperature color/shape/memory putty. The sheet was processed to 0.24 inch thick. The hot pressed sheet followed the exact contours of the doll face. Upon cooling below the melting transition of the putty composition, the plastic putty hardened to a stiff plastic character. Upon heating with a blow dryer, hot water, or with microwaves, the putty softens and changes color above its melting transition to a pliable putty like character. In the pliable state, the putty laminate can be molded, morphed, and re-contoured to a new doll face appearance. Upon cooling, the color change reverses and the putty hardens to a final facial appearance.

Example 20

Optical/shape/memory changing plastic coated impression forming foams and sponges: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition". Plastic sheets for forming optical/shape/memory foams and sponges were formed as in the example above "Pressure molded optical effect thermochromic, photochromic, photo-luminescent color/shape/memory changing plastic sheets and surface patterned items".

Thin sheets of optical effect color/shape/memory plastic were heat layered on to both closed and open cell foams and sponges. A first bottom sheet was placed on a Teflon coated pan. A cut rectangular form or sponge piece was centered on the sheet. A cut second piece was equally centered on top of the sponge piece. The sandwich was heated at 300° F. for 10 minutes until the upper sheet evenly draped over the sponge and came in contact with the sheet on the bottom of the sandwich. The melted top sheet fuse with the lower sheet and was permanently press fused to the bottom sheet to create a hermetic seal around the sponge. Excess sheet material was trimmed to yield a fully encapsulated sponge or foam piece.

At room temperature or below, the encapsulated coated foam piece was rigid and in one colored state. When the piece was heated with warm tap water or with warm air from a blow drier, the piece would exhibit the sponge like character of the encapsulated sponge. A variety of impressions, distortions, and sculptured configurations could be solidified if the piece were allowed to cool in new configuration. All of the optical properties and effects expected of the thermochromic, photochromic and photo-luminescent pigments were preserved and completely reversible on thermal cycling. The shape changing reconfigurations or molded impressions were completely reversible upon re-warming of the piece. The internalized sponge or foam material provided an abrupt spring back to the original molded rectangular form when warmed.

Example 21

General mending, fix-up, fixturing, restoration, and utility compositions comprised of color/shape/memory putties, and plastics: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition". High temperature putties were made according to the above example "High temperature thermochromic, photochromic or photo-luminescent color/shape/hardening putty compositions". The thermochromic colorants were selected to change color at the transition temperatures of either the putties or plastic so that they could be used as a safety mechanism to ensure that a user does not get scalded or burned.

Putties and plastics were used for mending, connecting, fixing, making fixture, making holders, fitting, reinforcing, thickening, altering or otherwise augmenting household and other items that could benefit from the added support, strength, or related reinforcement that the item required. Both the putty and plastic could be conveniently contoured and adapted to fit a particular application. The thermochromic effect was particularly useful to prevent burning and scalding. It was also useful as an internal guide to provide information on working time. As the color started to change, the color change indicated that the working time was almost expired.

Example 22

Thermochromic two part epoxy with moldable shape changing properties: A two component 5 minute epoxy was modified with the thermochromic bis-polydiacetylenic compound made from the diacetylenic monomer bis-2,2'-ethylene-(5,7-tetradecadiynoic acid) diamide. The diacetylenic monomer was polymerized room temperature (ultraviolet light, 254 nanometers) to a magenta color and prepared as a fine powder. The hardening solution of a two component 5 minute epoxy (Devcon Corp. Danvers, Mass.) was colorized with 2% by weight of the polydiacetylenic powder. The mixture became a deep magenta at room temperature. The thermochromically colorized hardening component remained stable under normal conditions for prolonged periods (more than 1 year).

A color/shape/memory epoxy plastic was made by mixing from 25% of the colorized hardening component to up to 50% of the colorized hardening component to from 75% of the epoxy component to 50% of the epoxy component respectively. Softer more temperature sensitive shape changing plastics were made with compositions less than 50% hardening component. In all cases, the epoxy mixtures cured within 5 to 10 minutes. The thermochromic material indicated elevated temperatures during the curing step and immediately after mixing due the exothermic reaction. The thermochromic material exhibited its brightest coloration to an orange yellow immediately prior to the 5 minute time frame indicating that the epoxy was about to set and that the working time had less than 30 seconds left prior to stiffening. The set thermochromic epoxy exhibited good color and shape change characteristic upon reversible heating and cooling cycles.

Example 23

Printed thermochromic color/shape/memory plastic die cut toy pieces including strips, rods, laces, tiles, and die cut shapes and figures: A shape changing plastic composition with combined shape memory properties and reversible thermochromic printed matter was formulated using a thermoplastic polyurethane (Rohm and Haas Corp., Philadelphia, Pa.). Images, messages, symbols, characters, cartoon characters, figures, graphics and printed information was screen printed using al 80 mesh silk screen and ultraviolet light curable thermochromic inks (Matsui International Inc., Gardena, Calif.).

0.01, 0.02, 0.03, 0.04, 0.06, 0.08, 0.1 and 0.2 inch thick shape changeable plastic sheets were prepared as in the above examples "Thermochromic color/shape/memory plastic composition" and "Pressure molded optical effect thermochromic, photochromic, photo-luminescent color/shape/memory changing plastic sheets and surface patterned items". Flat 12 inch by 12 inch sheets were screen printed using thermochromic ultraviolet light cured inks and a 1200 watt per inch square medium pressure mercury vapor lamp for curing. A variety of image types were printed using both low temperature (10° C., 15° C., and 20° C. reversible thermochromic inks) or higher temperature version (25° C., 27° C., 29° C., 31° C., 35° C., 37° C. and higher reversible thermochromic inks). The printed sheets/images retained full shape and color change characteristics of the full ranges expected.

Example 24

Color/shape/memory plastics for moldable items including: toothbrush tie strings/hooks, toy connectors, picture stands, hair bands, plastic utensils, foldable cups and plates: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition". The thermoplastic urethanes were utilized (Rohm and Haas Corp., Philadelphia, Pa. or Noveon Corporation, Cleveland Ohio). Thermochromic and photo-chromic could be used from various sources (Color Change Corporation, Streamwood Ill., Keystone Aniline Corporation, Chicago Ill., B&H Colour Change Limited, London England).

Molding was accomplished using methods described in the above example "Direct pressure molded optical effect thermochromic, photochromic, photo-luminescent color/shape/memory changing plastic structures". Processed shapes were die cut and/or trimmed. The initial molded configurations were set to appear as standard items. The contorted transient shapes could be pre-set prior at the factory prior to release and sale of the product or by a purchaser or user of the product during usage. To pre-set a new shape, the molded item was warmed, contorted and then chilled. The pre-set configuration would be sustained until the item was warmed again and allowed to re-achieve its original molded configuration. All of the thermochromic, photochromic or other color and shape change reversible properties of the molded pieces were maintained.

Example 25

Thermochromic, photochromic, photo-luminescent/shape changing pencils and pens: Optical effect color/shape/memory plastic batches were made in accordance with examples above "Thermochromic color/shape/memory plastic composition"; "Photochromic color/shape/memory plastic composition"; or "Photo-luminescent (glow-in-the-dark) color/shape/memory plastic composition". The thermoplastic urethanes were utilized (Rohm and Haas Corp., Philadelphia, Pa. or Noveon Corporation, Cleveland Ohio). Thermochromic and photo-chromic could be used from various sources (Color Change Corporation, Streamwood Ill., Keystone Aniline Corporation, Chicago Ill., B&H Colour Change Limited, London England). Flexible pencil lead graphite was used for the color/shape and memory pencil. Normal ball point pen plastic inserts were used for color/shape/memory change pens.

Tubular extruded rods of optical effect color/shape/memory changing plastic were formed using standard extruding means. Inner diameter bores were made to match the flexible pencil lead and ink pen insert diameters (2 millimeters and 3 millimeters respectively). Outer diameters for the whole rods were kept at 6 millimeters. The pencil was assembled by insertion of the flexible lead into the hollowed plastic tube, addition of a metal crimp to hold an eraser and final heated compression for finishing. The pen was assembled by threading a metal holder for attaching the ball point insert and placing a vented cap on the end of the pen barrel. In both cases, assembled pens and pencils exhibited all of the expected color, shape and memory properties of the formulated color/shape/memory plastics prepared. Both the pens and pencils could be warmed, contorted and frozen into positions of interest. A commensurate color change accompanied the shape change.

Example 25

Multiple response color/shape/memory change element that exhibits a simultaneous or sequential color and shape change in response to elevated cooking temperatures: A cooking device was developed for simultaneously reporting a cooking temperature through a thermochromic color and thermally induced shape change. A thermoplastic composition was prepared whereby a base nylon material was compounded at 25% with the thermoplastic shape-change material Estane™ 5778. A high-temperature reversible thermochromic dye was prepared and compounded into the plastic composition.

The composition was molded into a planar sliced disc configuration. Upon thermal heating the disc blades were folded upward to create an enclosed cavity. The composition was set in the closed cavity configuration. Upon heating and temperature monitoring, the comprising composition exhibited both thermochromic reversibility and shape change characteristics after exposure to elevated temperatures for 1 hour (300° F.). The dual effect of color and shape change provided a convenient method for visually identifying when a temperature had been achieved. The dual affect of a color and shape change provided a confident confirmation method for validating that a temperature had been achieved.

Example 26

A soft color/shape/memory change thermoplastic putty based advanced dental night guard device: A thermoplastic mixture comprising 33% by weight Protoplast™ (WRF Aquaplast Crop.), 66.8% by weight polyvinyl acetate Evatane™ 33-400 (Atofina Chemicals, Inc. Philadelphia, Pa.), and 0.2% by weight of the Thermochromic bis-polydiacetylenic compound made from the diacetylenic monomer bis-2,2'-ethylene-(6,8-nonadecadiynoic acid) diamide. The diacetylenic monomer was polymerized room temperature (ultraviolet light, 254 nanometers) to a deep blue color and prepared as a fine powder. Initially the thermoplastic composition was warmed to 200° F. and blended. After blending and cooling to 160° F., the thermochromic bis-polydiacetylene was added in a powder form and mixed to uniformity. The color/shape/memory composite exhibited good dental impression forming properties at elevated temperatures (150-155° F.) as well as thermochromic indication that the material had adequately soften as indicated by the integrated thermochromic agent.

Dental trays were thermoformed using $30/1000$, $40/1000$, $50/1000$, or $60/1000$ in thick thermoformable plastics. An upper jaw mold was made to match a medium bite. Polyvinyl chloride, polycarbonate, high density polypropylene, and Delrin™ were utilized as tray forming plastics. Slim tray designs were used (0.25 inch deep). The thermoplastic color/shape/memory composition was warmed to 160° F. by microwave and filled into the tray to a complete depth. Filled trays were allowed to cool to room temperature prior to use. The thermochromic material closely matched the softening temperature. The device turns a deep red when ready. Bright orange indicated that the material is too hot. Purple indicated setting/cooling and blue indicated complete set.

For use, a pan of water was heated to 155° F. Place a sample plastic tray down (thermal material up). The piece will turn from a purple hue to a deep red and then red at about the 1 minute mark. At 1 minute, the piece was immediately removed from the hot water in order to make a dental impression. Only a light to medium bite is required. Setting required holding the piece in the mouth 2-3 minutes. 3 mouthfuls of cool tap water were exchanged during the setting period. The sample could be remolded and could be re-used multiple times. The final formed tray exhibited good cushioning characteristics.

Example 27

A medium soft color/shape/memory change thermoplastic putty based advanced dental night guard device: A thermoplastic mixture comprising 49% by weight Protoplast™ (WRF Aquaplast Crop.), 49% by weight polyvinyl acetate Evatane™ 33-400 (Atofina Chemicals, Inc. Philadelphia, Pa.), and 2% by weight of the thermochromic colorant (60° C. reversible thermochromic pigment, B&H Colour Change Limited, London England). Initially the thermoplastic composition was warmed to 200° F. and blended. After blending and cooling to 160° F., the thermochromic pigment was added in a powder form and mixed to uniformity. The color/shape/memory composite exhibited good dental impression forming properties at elevated temperatures (150-155° F.) as well as thermochromic indication that the material had adequately softened as indicated by the integrated thermochromic agent.

Dental trays were thermoformed using $30/1000$, $40/1000$, $50/1000$, or $60/1000$ in thick thermoformable plastics. An upper jaw mold was made to match a medium bite. Polyvinyl chloride, polycarbonate, high density polypropylene, and Delrin™ were utilized as tray forming plastics. Slim tray designs were used (0.25 inch deep). The thermoplastic color/shape/memory composition was warmed to 160° F. by microwave and filled into the tray to a complete depth. Filled trays were allowed to cool to room temperature prior to use. The thermochromic material closely matched the softening temperature. The device turns a deep red when ready. Bright orange indicated that the material is too hot. Purple indicated setting/cooling and blue indicated complete set.

For use, a pan of water was heated to 155° F. Place a sample plastic tray down (thermal material up). The piece will turned from a deep blue hue to a bright off-white hue at 1 minute, the piece was immediately removed from the hot water in order to make a dental impression. Only a light to medium bite is required. Setting required holding the piece in the mouth 2-3 minutes. 3 mouthfuls of cool tap water were exchanged during the setting period. The sample could be remolded and re-used multiple times. The final formed tray exhibited good cushioning characteristics and a medium stiffness.

Example 28

A stiff color/shape/memory change thermoplastic putty based advanced dental night guard device: A thermoplastic mixture 66% by weight Protoplast™ (WRF Aquaplast Crop.), 32% by weight polyvinyl acetate Evatane™ 33-400 (Atofina Chemicals, Inc. Philadelphia, Pa.), and 2% by weight of the thermochromic colorant (60° C. reversible thermochromic pigment, B&H Colour Change Limited, London England). Initially the thermoplastic composition was warmed to 200° F. and blended. After blending and cooling to 160° F., the thermochromic pigment was added in a powder form and mixed to uniformity. The color/shape/memory composite exhibited good dental impression forming properties at elevated temperatures (150-155° F.) as well as thermochromic indication that the material had adequately softened as indicated by the integrated thermochromic agent.

Dental trays were thermoformed using $30/1000$, $40/1000$, $50/1000$, or $60/1000$ in thick thermoformable plastics. An upper jaw mold was made to match a medium bite. Polyvinyl chloride, polycarbonate, high density polypropylene, and Delrin™ were utilized as tray forming plastics. Slim tray designs were used (0.25 inch deep). The thermoplastic color/shape/memory composition was warmed to 160° F. by microwave and filled into the tray to a complete depth. Fill trays were allowed to cool to room temperature prior to use. The thermochromic material closely matched the softening temperature. The device turns a deep red when ready. Bright orange indicated that the material is too hot. Purple indicated setting/cooling and blue indicated complete set.

For use, a pan of water was heated to 155° F. Place a sample plastic tray down (thermal material up). The piece will turn from a deep blue hue to a bright off-white hue at 1 minute, the piece was immediately removed from the hot water in order to make a dental impression. Only a light to medium bite is required. Setting required holding the piece in the mouth 2-3 minutes. 3 mouthfuls of cool tap water were exchanged during the setting period. The sample could be remolded and re-used multiple times. The final formed tray exhibited good cushioning characteristics and a medium stiffness.

Example 29

Shape and color change element cooking thermometers: An insertable cooking thermometer with a pre-indicating shape change initially tells a cook that cooking is in progress. When the shape change has occurred, the cook is alerted to remove the thermometer within a specified time to tell precisely when cooking is near completion. The thermometer is further equipped with a color change element that indicates the exact level of doneness of the food type being cooked.

The thermometer can be molded with a convenient shape memory plastic that undergoes a shape change from a pre-set condition back to its original molded position. The composition comprising the molded piece will be determined by the duration of exposure to elevated temperatures for specified periods of time. By way of example, compositions find use that can hold a particular shape for a period of 30, 60, or 90 minutes at temperatures in the range of 300° F. to 450° F. The molded shape can be reshaped at elevated temperature and rapidly chilled to possess a distorted transient shape at room temperature and temperatures below the desired cooking temperature. Upon heating for a specified time and temperature, the pre-set distorted shape reverts to its original molded shape. The reversion can be designed to occur prior to cooking completion so that the shape change event can be used as a pre-indicator that cooking is in progress, but not compete.

Upon complete reversion of the shape change form the distorted pre-set shape to the original molded shape, the cook is alerted to utilize the thermometer for determining more precisely when cooking is complete. The thermometer may contain a temperature specified thermochromic agent at its distal to the shape-changing end. The device therefore would possess one end that is the shape changing pre-indicator for doneness and the other end that has a precise temperature sensing color change element that tells the exact level of doneness.

For use, the thermometer is inserted into a food type to be cooked prior to cooking. The insertion end possesses the thermochromic material necessary to determine exact doneness of the food type. The device is retained in the food type during cooking. As cooking proceeds, and at a specified time prior to completion of cooking, the shape change end sticking out of the food type will visually change shape. When the shape change becomes apparent, the device can be used as a thermometer by pulling it out of the food being cooked. If cooking is complete at the initial point of pulling the thermometer out of the food, the color change will be apparent. If the food is not yet cooked, the color change indicate incomplete cooking. The thermometer end can be reinserted into the same position so that cooking can be checked again. Cooks can continue to check doneness until the color change and cooking are complete.

Other applications:

Assorted other examples can include, but are not limited to: customized putty toothbrush holders, custom body armor items, custom finger positioning device for pencils and pens; and/or thermochromic color/shape/memory outdoor play toys for beach, sand, and backyard play and activities; make and play sets including animal, people, insect, flower, construction, skeletal, cooking, jewelry, and assorted play sets using color/shape/memory plastic pieces: universal connectors for various toys and house-hold applications; 3-D puzzles pieces made with color/shape/memory plastic; interactive color/shape/memory plastic packaging and demonstration; simultaneous dual temperature response automotive child safety; collapsing water containers, liquid containers, re-usable collapsible/shapeable storage containers as well as assorted other products and items that would benefit from multiple simultaneous or sequential optical, color, and shape changing elements.

The subject invention provides for a number of advantages, including the following.

Plural compositions possessing multiple enabling elements of optical change, color change, shape change, shape memory, and state change find wide variety of utility applications, entertainment applications, learning applications, educational applications, orthopedic application, construction applications, home-building applications, packaging applications, play applications including, but not limited to: "make and play" kits, toys, action figures, dolls, doll accessories, doll hair attachments, doll hair that can be rooted, games, puzzles, connectors that interface with existing or other future products, jewelry, arts and craft kits, construction kits, building kits, mending kits, as house-hold items, as retail items, a packaging items, display and promotional items, body armor, prosthetics and prosthetic device accessories, athletic equipment such as skies, balls and other sporting items, hardware usages, braces, mouth pieces, mouth guards, adhesives, footwear, clothing, multi-response temperature monitoring for a variety of applications including cooking and reporting doneness, and as a range of other consumer, military, industrial, and commercial products.

Shape or color change alone has been noted as interesting, but significantly less than the "magic" of novel materials that contain both properties of color and shape change together. Children have expressed interest in simple and complex shapes and objects made with color/shape/memory compositions. Simultaneous color and shape or color or shape changes that lead each other are of interest. Play patterns using color/shape/memory compositions can be done individually or as a group by passing shape along and changing it from child to child. A variety of new games are made possible. The final color and corresponding shape change should be dramatic and in a temperature range. Whereas children like the simple pieces, they express interest in complete toys made out of the color/shape/memory material. Boys and girls both express equal interest, but different desired play patterns, toys and play items based on color/shape/memory compositions can be designed for either young children and infants or up to teenagers and young adults. Schools and learning centers can find use for learning toys and items comprising color/shape/memory materials.

Multi-optical color/shape/memory compositions can take on a range of characteristics that may be desirable for particular applications. They can have purely plastic-like characteristics, purely putty-like characteristics, or a hybrid of the characteristics within the same composition. A market application of interest, processing traits, cost considerations and product specifications will dictate which enabling elements and physical characteristics will be utilized in the final composition comprising an item to be produced.

As such, the invention represents a significant contribution to the art.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A composite material comprising:
   a shape change component consisting of a thermoplastic polymer that is a shape memory thermoplastic polyurethane or a shape memory thermoplastic polyester and changes shape in response to a first applied stimulus; and a sole color change component consisting of a thermochromic pigment comprising a polydiacetylene incorporated into the shape change component that changes color in response to a second applied stimulus.

2. The composite material according to claim 1, wherein the material undergoes a shape and color change simultaneously.

3. The composite material according to claim 1, wherein the material undergoes a shape and color change sequentially.

4. The composite material according to claim 1, wherein the thermoplastic polymer and color change component are comolded.

5. The composite material according to claim 1, wherein the composite material changes both shape and color in response to a single applied stimulus.

6. The composite material according to claim 5, wherein the composite material changes both shape and color at the same temperature.

\* \* \* \* \*

UNITED STATES PATENT AND TRADEMARK OFFICE
CERTIFICATE OF CORRECTION

PATENT NO. : 11,061,259 B2
APPLICATION NO. : 15/783701
DATED : July 13, 2021
INVENTOR(S) : Hans O. Ribi Page 1 of 1

It is certified that error appears in the above-identified patent and that said Letters Patent is hereby corrected as shown below:

In the Specification

Please replace "waveflight" with -- wave/light -- (Column 1, Line 45).

Please replace "n-butylaerylate" with -- n-butylacrylate -- (Column 6, Line 42).

Please replace "copper (H)" with -- copper (II) -- (Column 14, Line 38).

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*